United States Patent [19]

Chatterjea

[11] 4,428,468

[45] Jan. 31, 1984

[54] CLUTCH-CLUTCH BRAKE STEERING MECHANISM FOR TRACTORS

[75] Inventor: Probir K. Chatterjea, Mount Prospect, Ill.

[73] Assignee: Dresser Industries, Inc., Dallas, Tex.

[21] Appl. No.: 287,539

[22] PCT Filed: Jun. 22, 1981

[86] PCT No.: PCT/US81/00844

§ 371 Date: Jan. 22, 1981

§ 102(e) Date: Jan. 22, 1981

[87] PCT Pub. No.: WO83/00034

PCT Pub. Date: Jan. 6, 1983

Related U.S. Application Data

[63] Continuation-in-part of Ser. No. 176,815, Aug. 11, 1980, which is a continuation of Ser. No. 951,690, Oct. 16, 1978, abandoned.

[51] Int. Cl.³ .............................................. B60K 41/24
[52] U.S. Cl. ................................................. 192/13 R
[58] Field of Search .................. 192/13 R, 13 A, 4 A, 192/12 C, 18 A, 13 R

[56] References Cited

U.S. PATENT DOCUMENTS 3,378,119 4/1968 Schaefer ........................ 180/6.7 X
4,164,276 8/1979 Shore et al. ...................... 192/13 R

FOREIGN PATENT DOCUMENTS 575313 2/1946 United Kingdom ............. 192/13 R

Primary Examiner—George H. Krizmanich
Attorney, Agent, or Firm—Roy L. Van Winkle

[57] ABSTRACT

Clutch-clutch-brake steering unit having hydraulically actuated cylinders for controlling same to control rotation of a track-drive sprocket in a crawler tractor. Specifically, one of the clutch cylinders and a brake cylinder provided in the unit have an inlet-outlet port in common, and are so arranged on a spring-applied-brake, hydraulically-applied-clutch basis that a single pressure signal in the inlet-outlet port alternately operates the cylinders to apply the brake and release the one clutch, to apply the one clutch and release the brake or, by proper modulation, to partially engage either, i.e., slip the clutch or drag the brake to intermediate degrees as desired. And, to nearly the same extent, the other clutch cylinder and the brake cylinder provided in the unit have inlet-outlet ports in common and are similarly arranged that the absence or presence of a single pressure control signal in their inlet-outlet ports alternately operates the cylinders to apply the brake and release the other clutch, or to apply the other clutch and release the brake.

2 Claims, 14 Drawing Figures

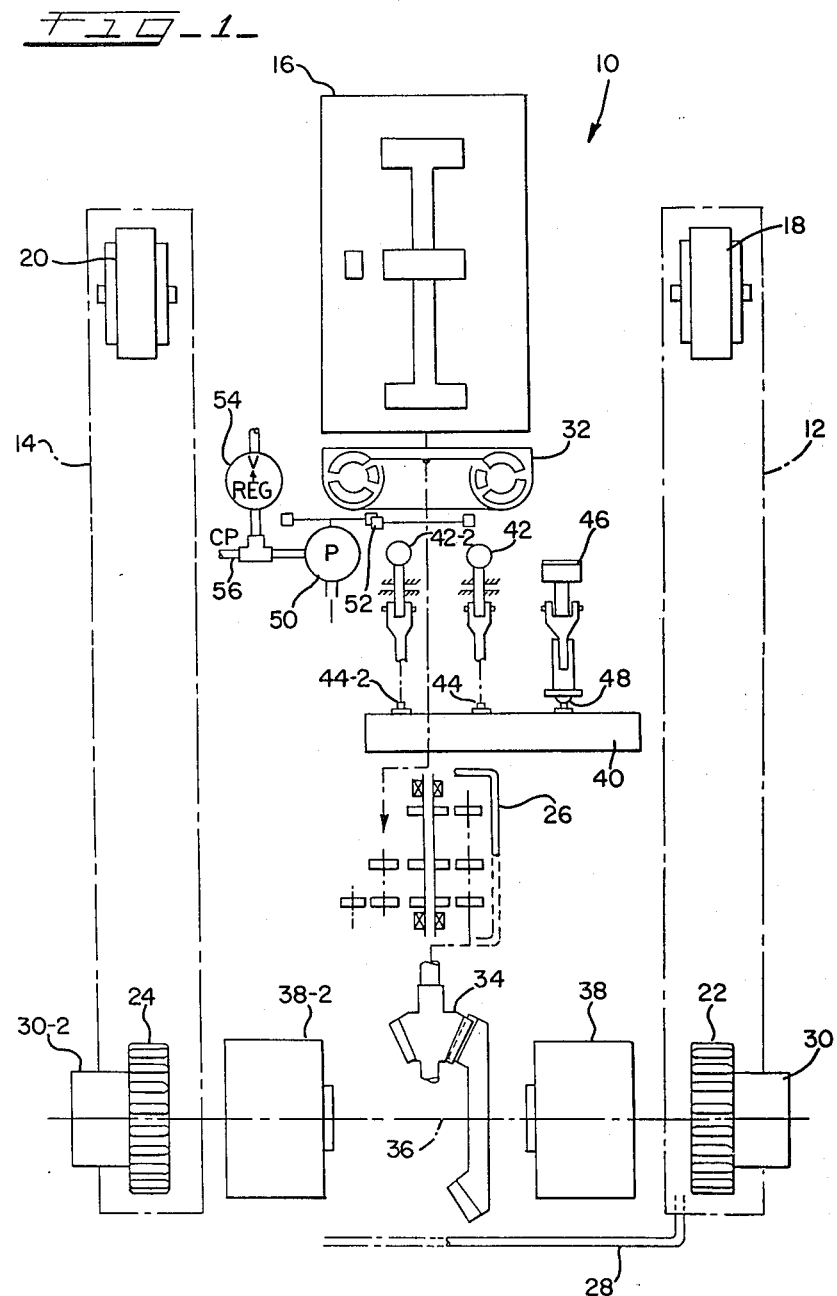

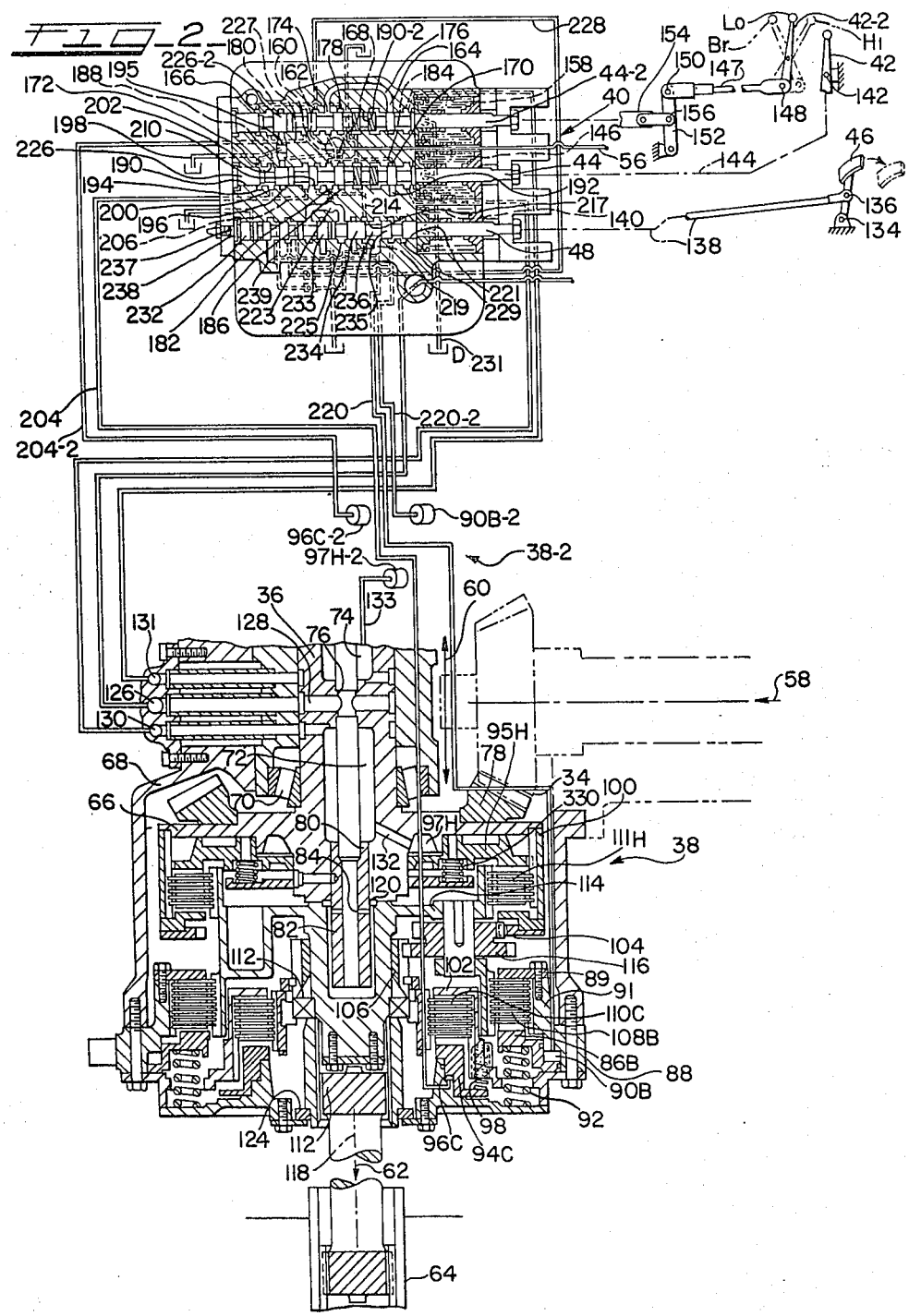

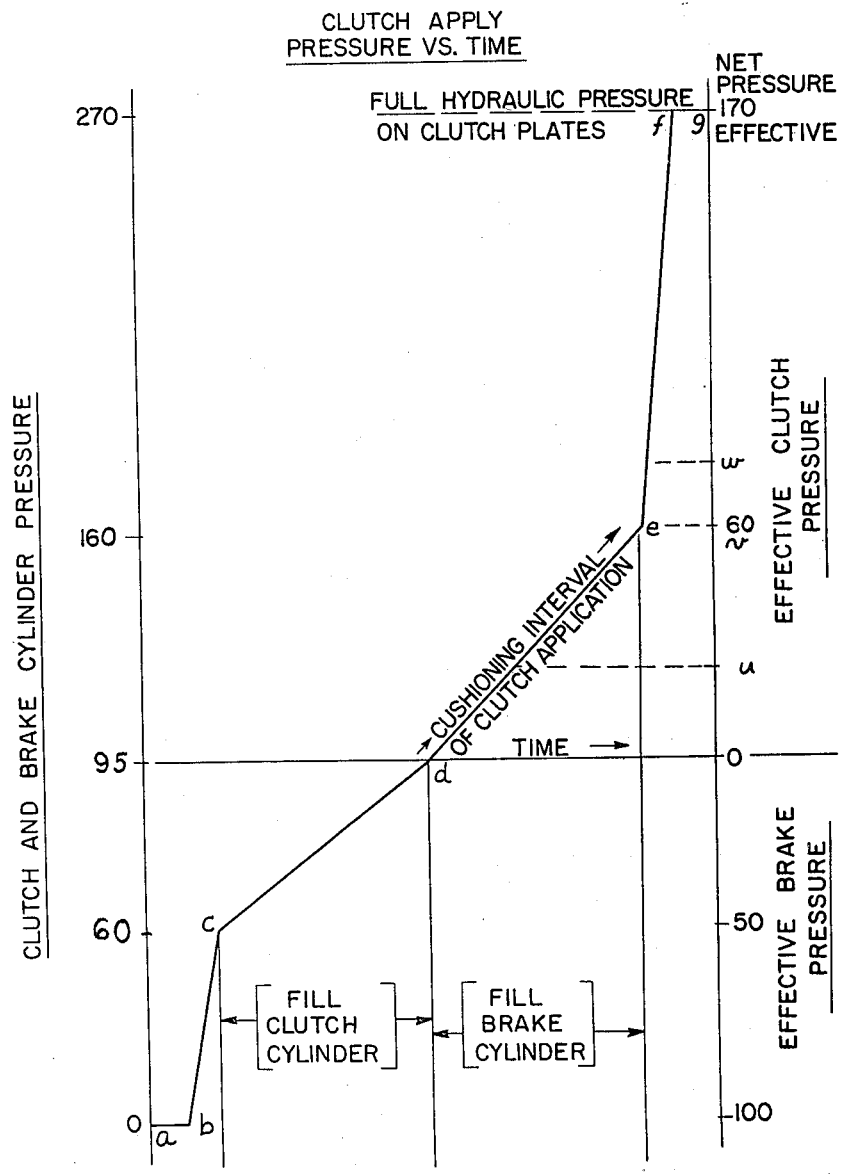

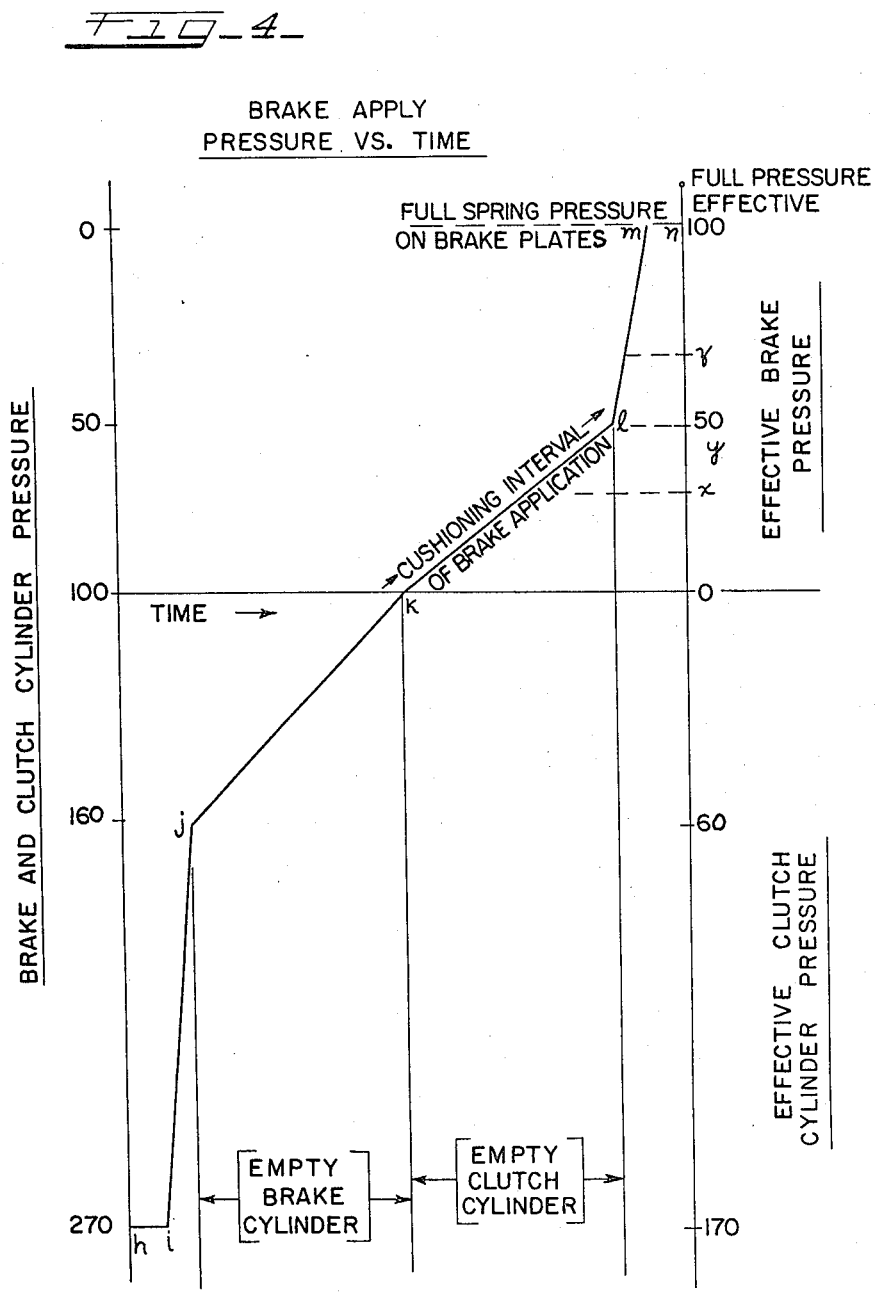

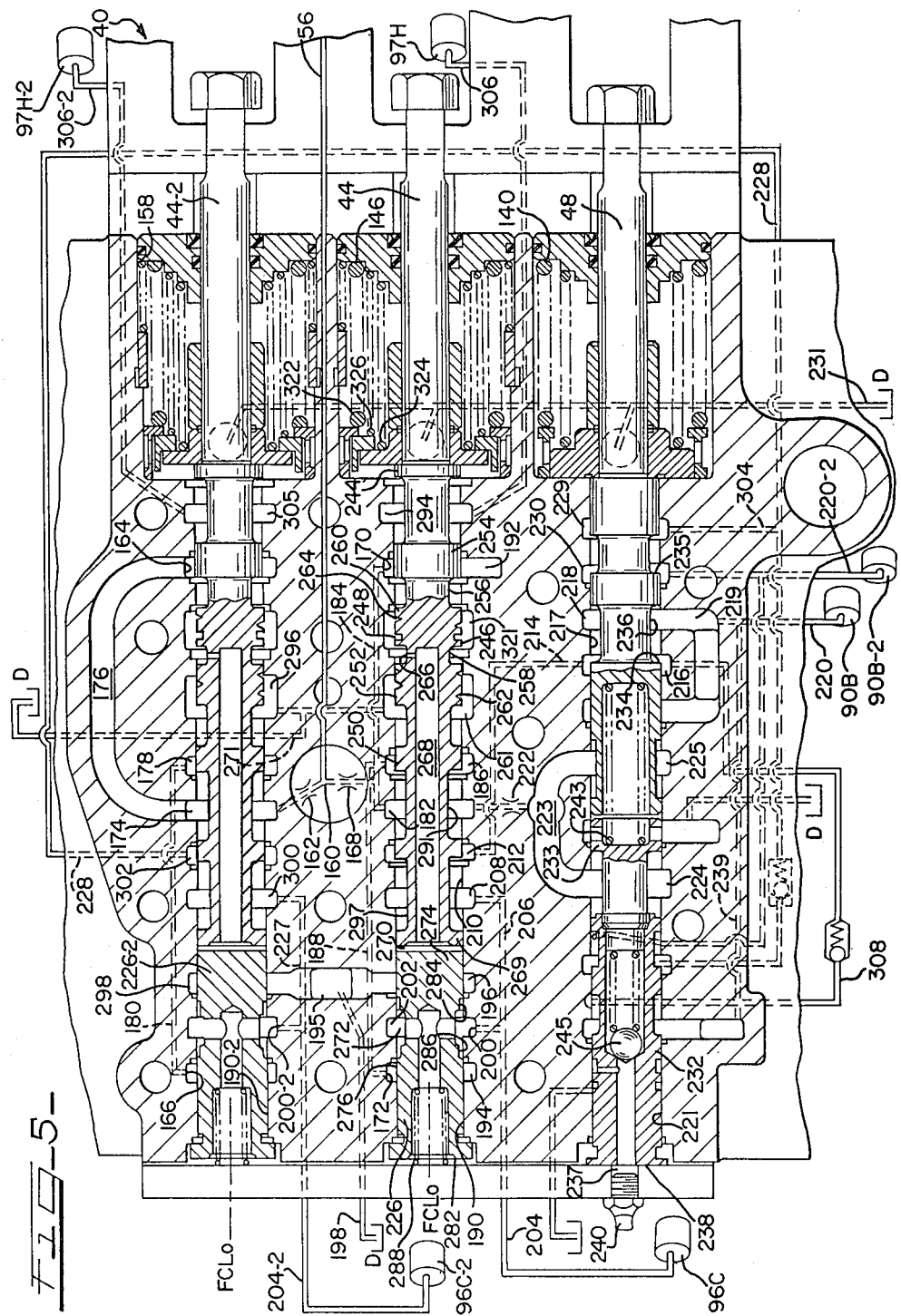

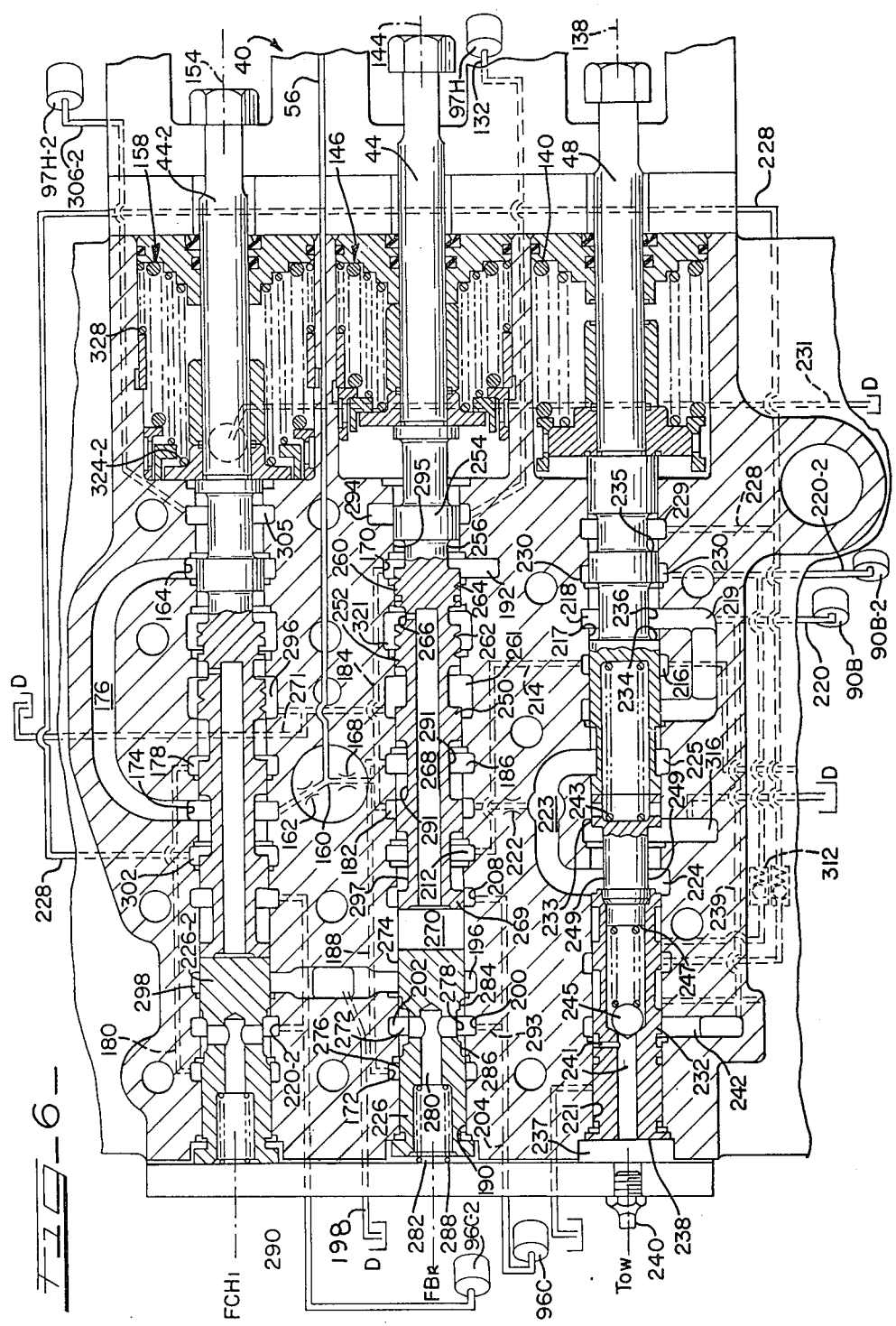

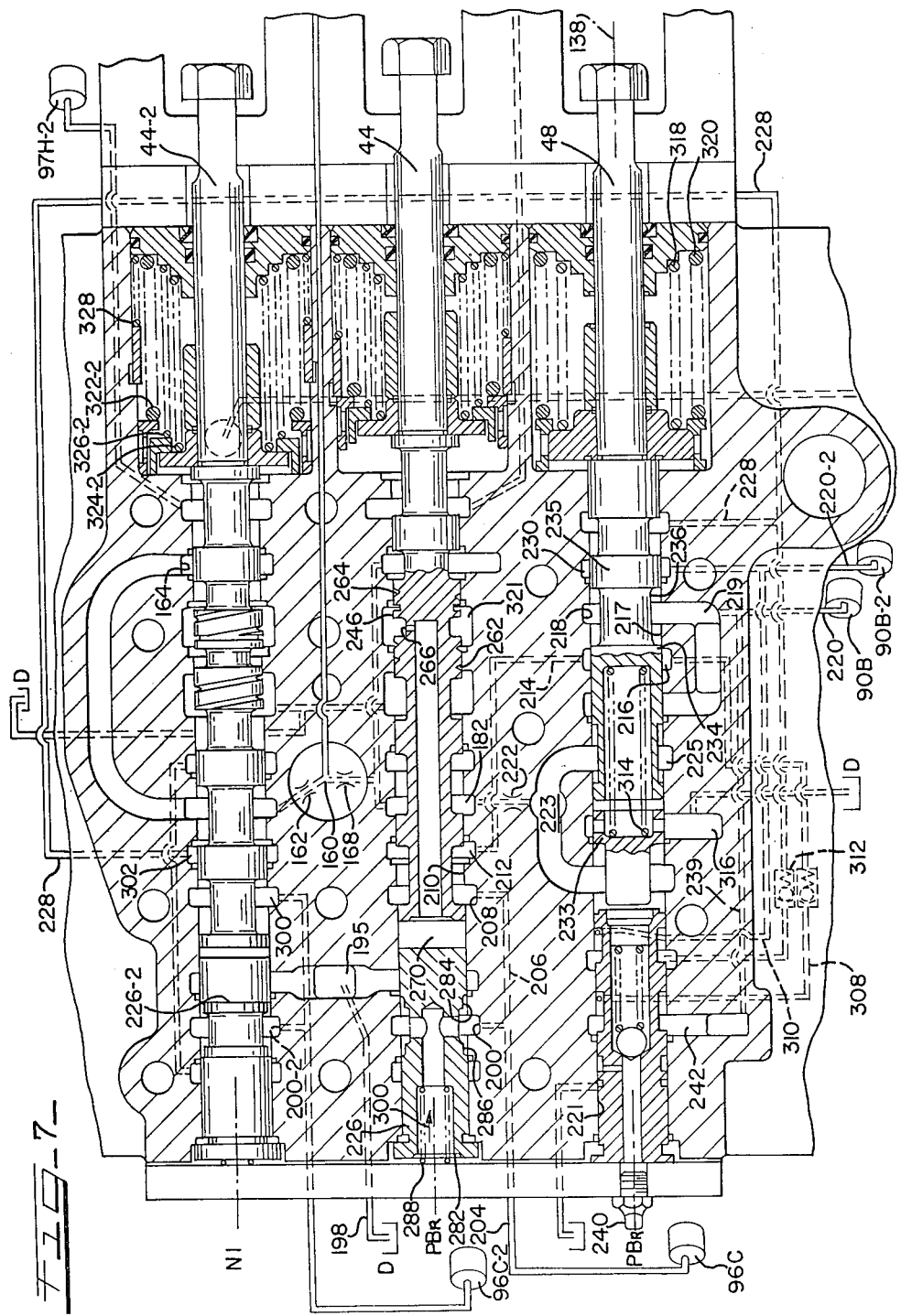

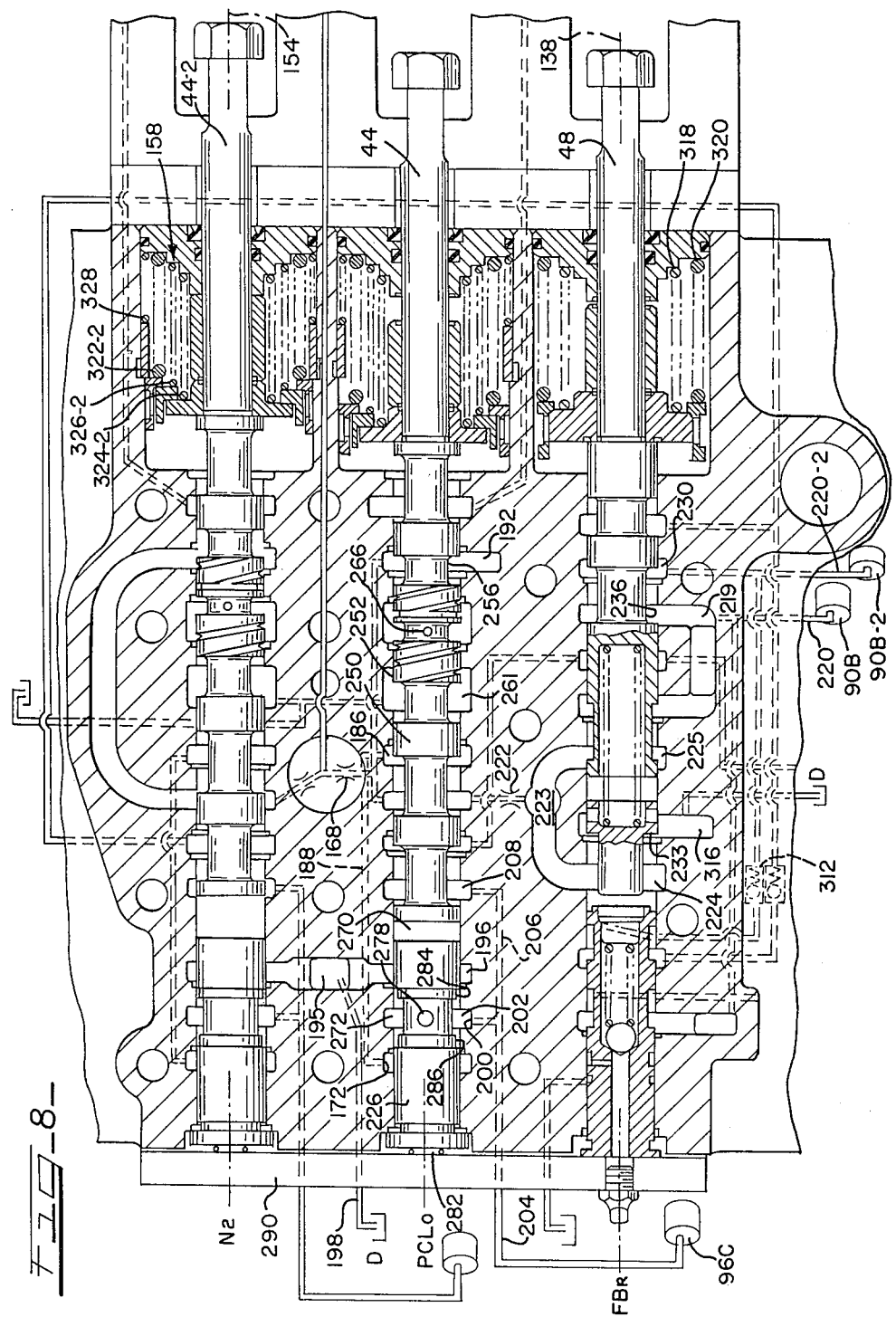

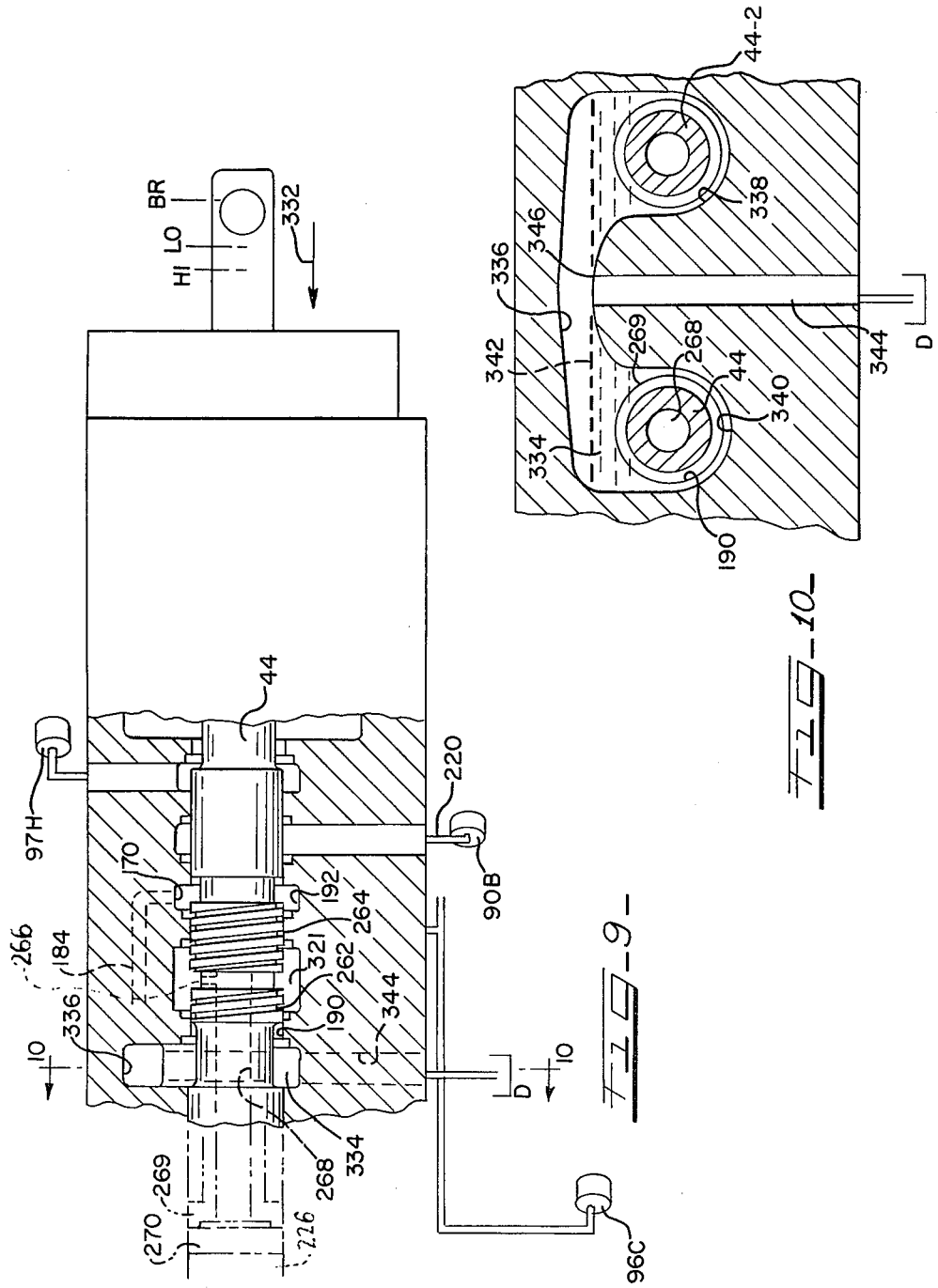

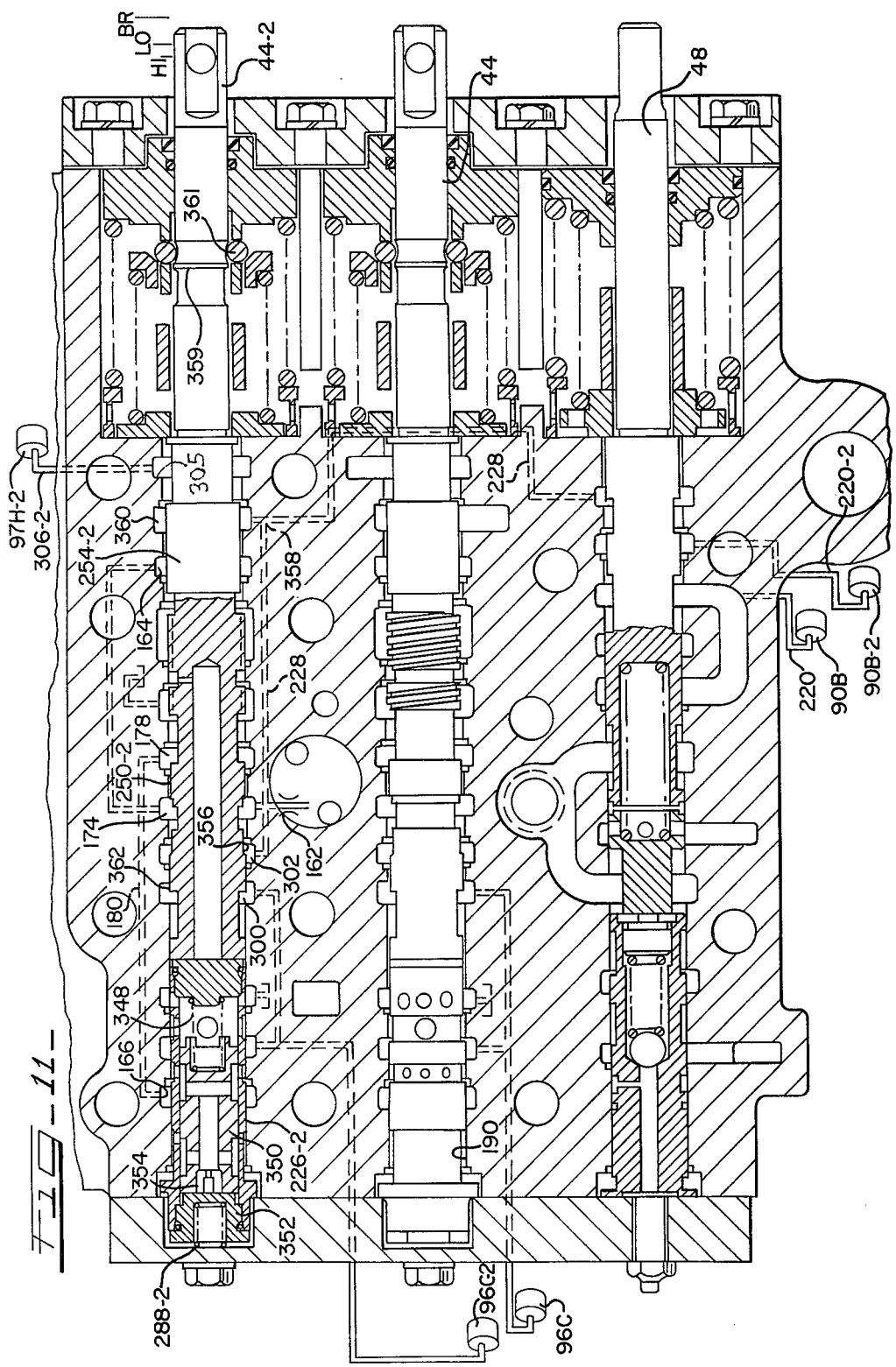

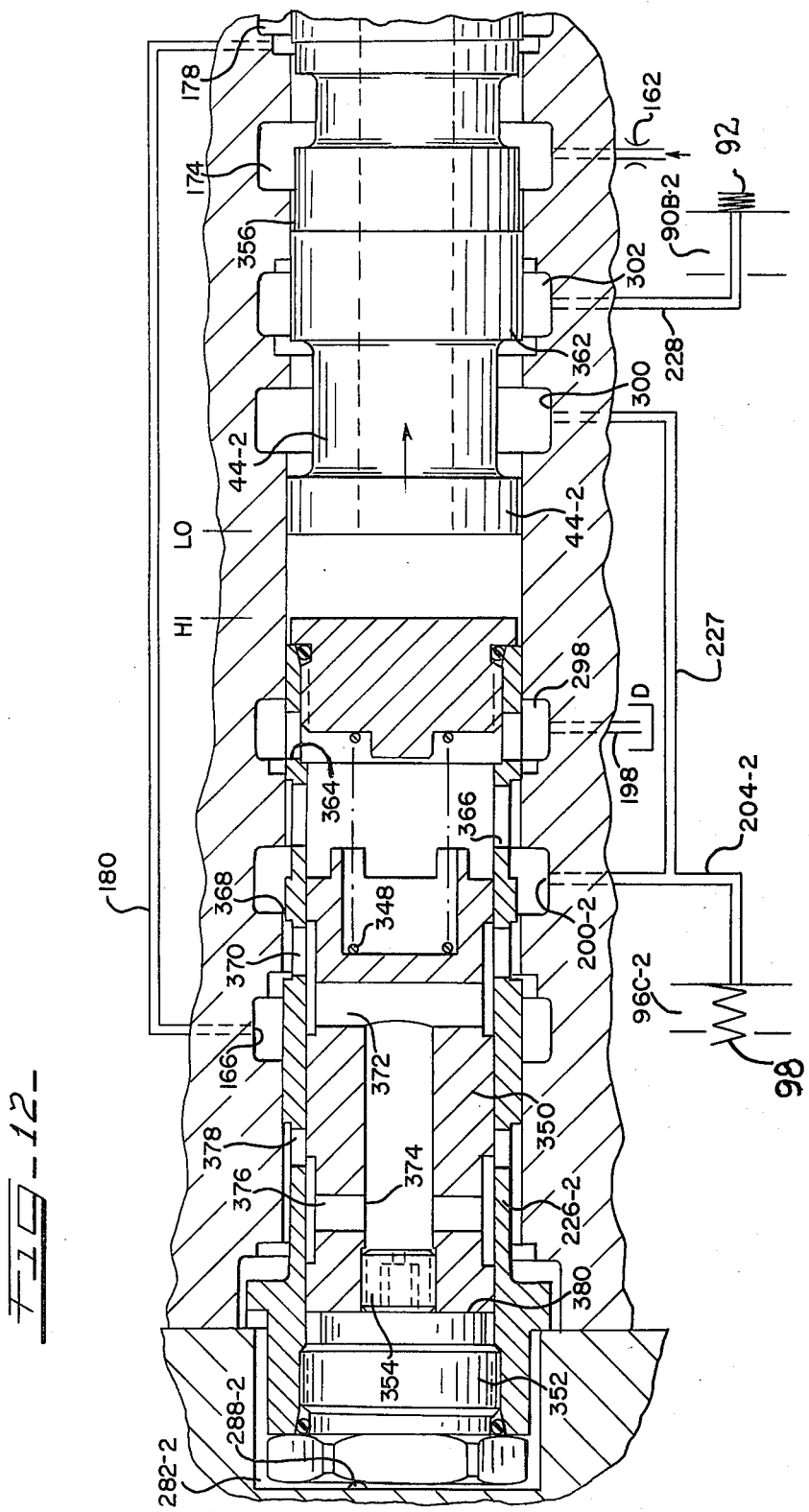

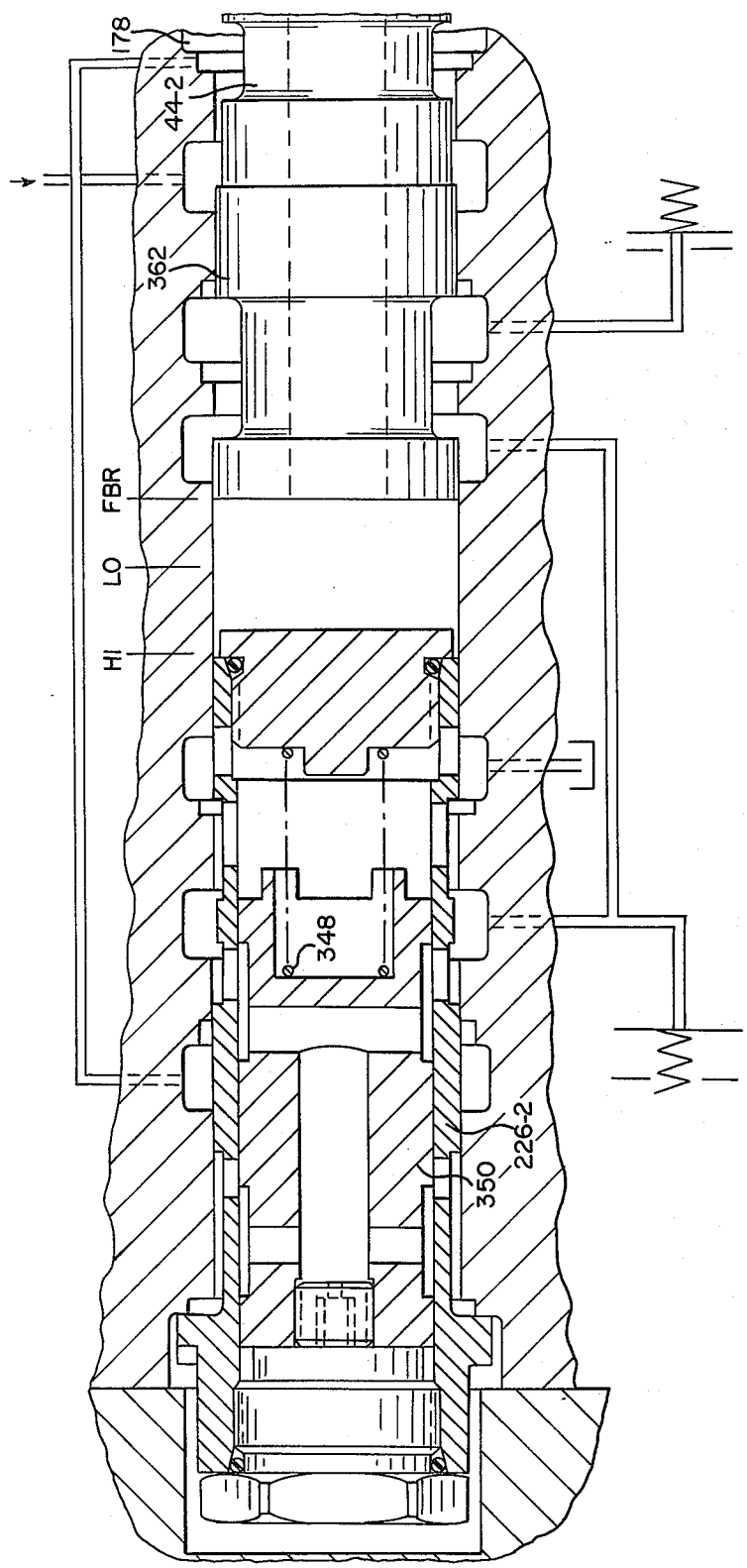

CLUTCH-CLUTCH BRAKE STEERING MECHANISM FOR TRACTORS

This application is a continuation in part of Ser. No. 176,815 filed Aug. 11, 1980, which was a continuation of application Ser. No. 951,690 filed Oct. 16, 1978 and now abandoned. A related patent application Ser. No. 436,159 which was filed Oct. 22nd, 1982, is a Division of Ser. No. 176,815.

The present application relates to clutch-clutch-brake mechanism for use in vehicles which are steered-by-driving. More particularly, the application relates to the left and right clutch-clutch-brake steering units for a crawler tractor. Left and right clutch-brake steering units are disclosed in the co-assigned U.S.A. crawler tractor patents noted, U.S. Pat. Nos. 4,015,619 and 4,164,276, which have only steering-brake turns with no geared steering; whereas the second clutch of the clutch-clutch-brake mechanism hereof superimposes the geared-steer option affording, along with other versatility of significance hereinafter emphasized, the rub-free type of full power turns, left and right, with no rubbing and friction losses in the friction clutches which are not allowed to slip and no rubbing and friction losses in the steering brakes which are not allowed to drag, while steering with gearing.

Background patents further include but are not limited to U.S. Pat. Nos. 1,835,790, 2,323,115, 2,447,920, 2,974,639, 2,984,213, 3,215,044, 3,220,318, 3,221,770, 3,460,577, 3,540,559, 3,677,362, 3,693,503, 3,706,322, 3,757,915, 3,843,205 and particularly Bidwell U.S. Pat. No. 3,018,041.

It is an object in connection with steering mechanism according to my invention, to provide an alternately acting hydraulically actuated clutch-clutch-brake unit so arranged that braking is automatic (spring applied) upon failure of hydraulic pressure, thus affording fail-safe braking.

An object in line with the preceding objective is to provide a clutch-clutch-brake unit in which one clutch and brake are siamese-connected for pressure actuation of same, and in which a single signal is therefore usable for clutch-brake control pressure both for the one clutch and for the brake in the unit; provision is made in the same way for clutch-brake control pressure both for the other clutch and for the brake in the unit. One such clutch constitutes the hi speed clutch providing for a high gear drive, and the other such clutch constitutes a lo speed clutch providing for a low ratio gear drive through the steering unit.

A further object is to provide a metering valve for controlling clutch-brake pressure, also provide an inlet-outlet port to which the lo clutch and brake cylinders are connected in common and controlled by the metering valve as the clutch-brake control pressure is applied or released, and additionally provide correlated sets of springs on the lo clutch and brake causing engagement of each cylinder to be cushioned by delayed pressure-change owing to the fact that the volume of the cylinder of the other is undergoing a metered change because of the metering valve's restrictive control over the common inlet-outlet port.

Also, even though the gear ratio is fixed in high gear, and fixed in low gear, and the high gear clutch is unmodulated, there is an additional object in connection with the lo clutch and brake cylinders. Pressure to their aforesaid inlet-outlet port is modulated with the object to slip the lo speed clutch for controlled speeds in the upper half of the low speed range and to drag the brake for controlled speeds in the lower half of the low speed range.

Another object of the invention, in line with the foregoing objective because similarly in connection with the lo clutch and brake cylinders, is the provision of a hydropotentiometer type steering valve spool having, among others, two well defined Br and Lo positions in order to select for operation the cylinders concerned for full braking and for full lo clutching, respectively, and utilizing a bore core standpipe effect to provide its own dashpot effect in being positioned. More particularly, there is no spool overshoot as the steering valve spool advances at its leading end in a bore and reaches Lo position, because the hydropotentiometer provides a restrictive connection between the end-displaced fluid and a standpipe reservoir maintained with a level above the spool; conversely, there is no cavitation or air-bubbled-in as the steering valve spool withdraws that leading end in the bore and retracts into the Br position, because the restrictive hydropotentiometer naturally remains submerged and, with simple flow reversal, reintroduces all the bubble-free replenishing fluid necessary from the high lel reservoir above.

A further object, in line with the foregoing objective in connection with the two well defined positions of the hydropotentiometer type steering valve spool as provided, is to provide a third well defined spool position Hi affording maximum signal pressure simultaneously in the hi clutch and brake cylinders, and to provide preparatory to retracting the spool from the Hi to the Lo position an automatic means of delay, of brake cylinder bleed-off, and of pressure equalization at an appreciably reduced level between the lo and brake cylinders to insure the refilling of both by delayed pressure-change for the above referred to inherent clutch engagement cushioning in the way desired.

An additional object is to provide consolidated valving in a housing so simplified that a minimum number of spool bores are provided, and in compact manner and with internal interconnections of minimum length.

According to practice in the past in connection with some clutch-clutch-brake steered crawler tractors, the steering clutch has been operated through a controlled rate-of-rise valve to cushion clutch engagement. Similarly the companion brake has been operated through a second valve and, if the manner desired has been to cushion the brake engagement, the second valve has likewise afforded controlled rate of pressure rise in the brake cylinder. It has therefore been the practice to have some accurate coordinating means providing for precise coordination of operation of the two clutch and brake valves, which due to tolerance stackup only slightly overlap in operation so as to ensure appreciable releasing of the engaged clutch prior to starting to engage the brake, and vice-versa. Ideally, there is no overlap and in fact in the normal case a slight underlap is achieved. Disadvantages and inherent complications have arisen because of the need for special rate-of-rise valve control and coordination of the valve operations in controlling or slowing rate of pressure rise in the cylinders.

My invention materially reduces, if not substantially eliminating, the foregoing disadvantages and complications, as will now be explained in detail. Various features, objects, and advantages will either be specifically pointed out or become apparent when, for a better understanding of my invention, reference is made to the following description taken in conjunction with the accompanying drawings which show a preferred embodiment thereof and in which:

FIG. 1 is a schematic view, in top plan, of a crawler tractor embodying my hydraulically actuated, clutch-clutch-brake invention;

FIG. 2 is a partially schematic, cross sectional view of a clutch-clutch-brake mechanism and hydraulic control circuit therefor;

FIGS. 3 and 4 are graphs showing the desired pressure-time traces involved in achieving respective cushioned clutch application and cushioned brake application;

Figure 13:
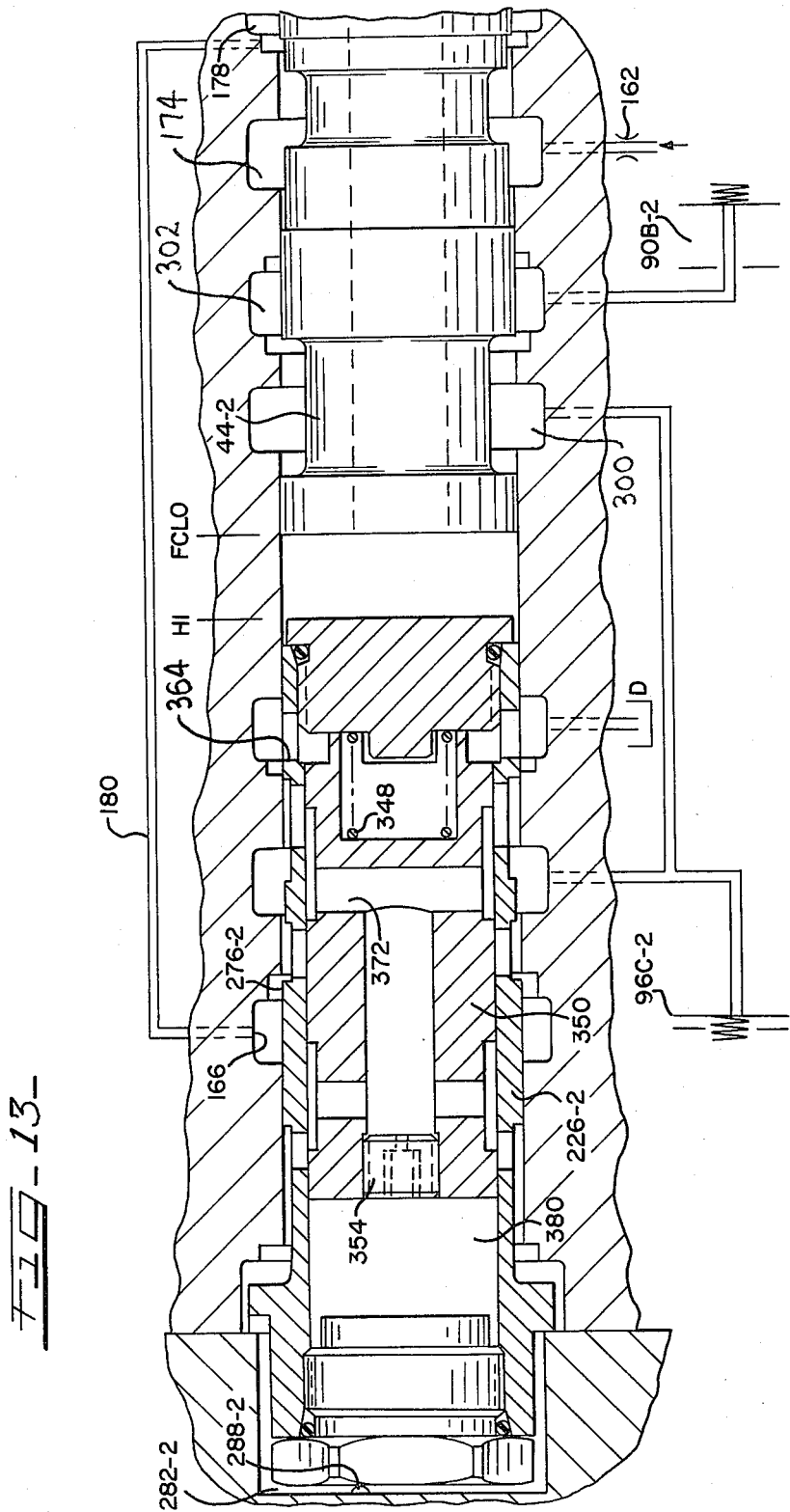

FIGS. 5, 6, 7, and 8 are partly schematic, cross sectional views of a steering valve, showing it in various positions in its operation in the hydraulic control circuit of clutch-clutch-brake mechanism;

FIG. 9 is generally similar in view to FIG. 7 in showing a partial braking condition, but illustrates a modification which FIG. 10 illustrates in a cross sectional view taken along the line 10—10 of FIG. 9; and FIG. 11 is a view similar to FIG. 6, but illustrating another embodiment of the invention.

FIGS. 12, 13 and 14 are enlarged cross-sectional views similar to a portion of FIG. 11, illustrating the embodiment of FIG. 11 in various operating positions.

More particularly, in FIG. 1 of the drawings, a crawler tractor 10 is shown having undercarriage structure including right and left endless track assemblies 12 and 14, having a front mounted engine 16, and having a chassis, not shown, supported on the undercarriage structure and supporting the engine 16. The undercarriage structure further includes at its respective sides right and left front idler wheels 18 and 20 and right and left track drive sprockets 22 and 24.

The power train from the engine 16 of the tractor includes a three-speed, reversible power shift transmission 26, a rear main frame 28 holding the steering mechanism, and suitable interconnections in the power train whereby the sprockets 22 and 24 receive their driving torque, as from a right final drive 30. More specifically, a torque converter 32 interconnects the engine 16 and the power shift transmission 26. Meshing bevel and crown gearing 34 interconnects the transmission 26 and the rear axle 36 of the tractor, and a right steering clutch-clutch-brake unit 38 controls power rotation for braking of the right final drive 30 which is supplied with torque by the rear axle 36.

For purpose of hydraulic control over the steering mechanism in the rear main frame 28, the tractor 10 has a steering valve assembly 40 and, for that purpose, the steering valve assembly has operator-operated hand levers including a right steering lever 42 connected to a right-steer spool valve 44 included in the valve assembly 40. A brake pedal 46 is connected to a brake spool valve 48 included in the valve assembly 40.

The steering valve connections are omitted from FIG. 1 for simplification, but receive the usual hydraulic fluid for their operation from a rotary pump 50 which can be directly engine-driven or, as illustrated, is driven by a meshing pinion and gear 52 which are connected to the output side of the torque converter 32. A regulator valve 54 which is teed to the output side of the pump 50 has a constant setting so that pressure in the output line 56 will be essentially constant, e.g., 290 psi (20 atmospheres) under varying pump speeds.

The steering controls and drives in the tractor 10 are essentially symmetrical, thus further including, for the left side, a second steering lever 42-2, a second steering valve 44-2, a second clutch-clutch-brake unit 38-2, and a second final drive 30-2. The valves 44 and 44-2 are modulator valves essential to the modulation accomplished in the steering valve assembly 40 referred to in the paragraph following; also, the steering units 38 and 38-2 constitute a multi-ratio drive and braking train essential to my purposes in producing the overall operation now to be described.

In operation of the tractor 10, torque in the power train from the engine 16 is applied through the torque converter 32 to the power shift transmission 26 and gearing 34, which drive the rear axle 36 at a speed and in the direction selected. Line pressure from the line 56 is applied with appropriate modulation by the steering valve assembly 40 to the clutch-clutch-brake units 38 and 38-2 so that the operator can cause the sprockets 22 and 24 to rotate the endless track assemblies 12 and 14 at the same speed for straight line drive in either direction, or at different speeds for power turns or braked turns, either left or right forwardly, or left or right rearwardly.

STEERING MECHANISM—FIG. 2

In accordance with the arrowed path appearing in this figure, power flow from the transmission, not shown, follows along a propeller shaft in the path of an arrow 58 into the bevel and crown gearing 34 so as to be conducted laterally by the rear axle 36 in the opposite directions indicated by a double headed arrow 60. In the right direction, for example, lateral power flow from the axle and right steering clutch-clutch-brake unit 38 is in the direction of an arrow 62, through bull gearing 64 and the right final drive 30, not shown, thence into the right track drive sprocket 22. More particularly, except for a radial flange 66 integrally carried by the axle adjacent its right end, the axle 36 which is hollow is generally symmetrical when one end is compared to the other. The axle 36 is journalled for rotation in a clutch-clutch-brake housing 68 by means of a span of bearings including a tapered roller bearing 70 illustrated. Longitudinal passages in the axle 36 include separate, oppositely extending hydraulic passages 72 and 74 which are parallel to, and hydraulically separated by pressed-in tubes from, the hollow interior 76 thereof. The referred to radial flange 66 at its periphery carries a crown gear 78 meshing with the bevel pinion of the gearing 34 and driving the axle 36 through a desired reduction gear ratio.

A bore 80 in the end of the axle 36 receives a pressed-in sleeve 82, and the sleeve 82 transmits to lube passages 84 and 85 bearing lubricant supplied to the hollow interior 76.

A right-steer brake includes an hydraulic brake piston 86B sealed within, and adjacent, a steering drive cover 88, a back plate 89, a brake cylinder 90B, a splined member 91 grounded by the cover to the steering gear casing, and brake springs 92 for the spring-applied, pressure-released brake.

Selective gear ratio clutch actuations are afforded by a lo clutch piston 94C and cylinder 96C, and by a hi clutch piston 95H and cylinder 97H.

The counterpart left-steer cylinders for braking, lo clutching, and hi clutching appear at 90B-2, 96C-2, and 97H-2.

The lo clutch includes clutch release springs 98 and a backing plate 102. A planetary gearset to provide the lo clutch ratio drive (e.g., a 1.3:1 gear reduction) within the clutch housing 100 includes an input ring gear 104 carried by the housing 100 and a sun gear reaction member 106 therewithin. An output shaft 112 coaxial with axle 36 is sleeve-splined to an output carrier 114 in the planetary carrying a set of dual planets 116.

The smaller set of pinion teeth on each dual planet 116 continually meshes with the input ring gear 104, and the larger set of pinion teeth continually meshes with the reaction sun 106. The sun 106 is grounded to the case by a disk stack 110C in the modulated lo clutch when the latter is actuated, whereupon the ring to planets to carrier drive causes the lo ratio speed output desired from the output shaft 112.

The sun reaction member 106 will be free of restraint, whereas the output carrier 114 is grounded to the case by a disk stack 108B in the modulated brake when the latter is actuated, whereupon motion of the output shaft is either arrested or braked to a bolt and, in the idle set of planets 116, each one is freely rotated, unloaded, on its orbiting or braked-stationary axis.

Finally, the sun reaction member 106 and output carrier 114 will have conjoint rotation and the planetary gearset will be locked up, whereas the input ring member 104 and the output carrier 114 are directly clutched together by a disk stack 111H in the unmodulated hi clutch when the latter is actuated, whereupon the locked planetary provides a 1:1 direct drive between the input ring 104 and output shaft 112.

The carrier 114 and output shaft 112 share the common output axis 118 defined by their bearings 120, 122, and 124 in the housing 68.

A stationary, case mounted lube oil header 126 supplies lubricating oil in customary way to the rotating axle 36 through a hole 128 in the latter leading into its hollow interior 76. In similar manner, hi clutch headers 130 and 131 supply control oil to their clutches respectively in a path including passage 72, thence a passage 132, and into a right hi clutch cylinder 97H, and in a path including passage 74, thence a passage 133, and into a left hi clutch cylinder 97H-2.

The left clutch cylinder 97H-2 is under hydraulic control, through the aforesaid path, from valving hereininafter described and operating in a second bore 190-2 of the valve assembly 40 which can be viewed overall, with respect to its totality of bores and purposes, as a consolidated valving assembly means.

STEERING OPERATORS—FIG. 2

Hand and foot operation is utilized according to the illustrated example in FIG. 2, and the operators comprise the brake pedal 46, and the left and right steering levers 42-2 and 42. The brake pedal 46 has a bottom pivot 134 and, through a clevis connection to a mid-pin 136 on the pedal arm, the pedal 46 operates a pull connection 138 to pull the foot brake spool valve 48 to a braking position as opposed by spool valve return spring means 140. The brake-applied position of the pedal is shown in broken lines in FIG. 2.

The steering levers have a mid-pivot such as illustrated at 142 for the right steering lever 42 and, as shown in FIG. 2, the connection from the steering lever 42 is schematically illustrated at 144 which interconnects with the spool valve 44 to pull it into the braked position as opposed by spool valve return spring means 146. Or especially as can be seen in FIG. 2, the connection to the left steering lever 42-2 is more fully illustrated to include a pull link 147 having a front clevis connection to a bottom pin 148 on the lever 42-2, a rear clevis having a connection to a top pin 150 on a bottom-pivoted link 152, and a pull link 154 connected to a mid-pin 156 on the link 152 and connected to the left spool valve 44-2 so as to pull the latter against the resistance of spool valve return spring means 158.

STEERING HYDRAULICS—FIG. 2

In the hydraulic circuit as shown according to this figure, near the top the line 56 carrying line pressure splits up at 160 into a first branch 162 connected to a composite pressure port 164 in the steering valve assembly 40 and into a second branch 168 connected to a composite pressure port 170. More specifically, fluid from the first branch 162 to the port 164 flows in a path including a valve bore core 174 and a U-passage 176 connected to the port 164. Splitting off from that path, fluid also flows from the bore core 174, through the adjacent bore core 178, thence through a passage 180 to a metering pressure port 166.

Fluid from the second branch 168 flows through a U-passage 184 to reach the port 170, and also flows therethrough to a metering pressure port 172 via a bore core 182, the adjacent bore core 186, and a passage 188 thence to the port 172.

A first bore 190 of the consolidated valving assembly means 40 slidably receives the right clutch spool valve 44, and communicates with the pressure port 170 through a bore core groove 192, and with the pressure port 172 through a bore core 194. The bore 190 communicates to drain D via a bore core 196, a cross passage 195, and a drain line 198.

Through a bore core 202, the bore 190 supplies an inlet-outlet port 200 having a right-steer lo clutch branch 204 therefrom leading to the lo clutch cylinder 96C. The port 200 has a brake branch 206 supplying the right-steer brake cylinder 90B, via a bore core 208, a port 210, a bore core 212, a cross passage 214, a bore core 216, a port 217, a bore core 218, a U-passage 219, and a brake conduit 220 leading to the brake cylinder 90B.

A third or brake bore 221 in the consolidated valving assembly means 40 is connected to the line-pressure connected right-steer branch 168 via the bore core 182, a restriction 222, a U-passage 223, and bore cores for the brake bore 221 shown at, respectively, 224 and 225 at opposite ends of the U-passage 223.

The inlet-outlet port 220 is controlled by a metering valve spool 226 in an end of the right-steer bore 190. The left-steer bore 190-2 has a corresponding, controlled inlet-outlet port 200-2, splitting up into a first branch passage 227 hereinafter discussed and a second branch passage 204-2 leading to the left-steer lo clutch 96C-2.

Between the left-steer bore 190-2 and brake bore 221, a brake passage 228 conducts fluid from the former to the latter via a line 304, a bore core 229, and a bore core 230 which supplies the left brake line 220-2 and the left brake cylinder 90B-2.

A common passage 231 connects the various chambers for return spring means 140, 146, and 158 to drain D.

TOW VALVE—FIGS. 2 and 5

A slidable two spool valve 232 in the brake bore 221 has a hollow interior and, at the inner end of the hollow valve, it is plugged by and made fast to the adjacent end section 247 of a brake metering spool 233 employed in the bore. An integral mid-section of the metering spool 233, which is otherwise cylindrical for riding with sliding contact with the bore, is formed top and bottom with flats 249 to insure communication of the bore core 224 with drain during full braking, hereinafter described.

Also employed in the bore are a land 234 and a land 235 which are on the brake spool valve 48 and are separated by an intervening groove 236 on the spool.

A chamber 237 pressurizable with oil or grease during a towing emergency contains therein the end of the tow spool valve 232 which presents a pressure movable area 238. An emergency brake passage 239 communicates the grease directly to the right brake conduit 220 and brake cylinder 90B and, via the spool groove 236, to the left-steer brake conduit 220-2 and brake cylinder 90B-2.

The grease is admitted to the system from the fitting of a gun, not shown, applied to a one-way nipple or grease valve 240, and reaches the brake passage 239 through spool passages 241 and an interconnecting bore core 242.

The present tractor lacks flexibility in that coasting does not come to it as a natural function, and so special provision is necessary as in instances where it must accommodate to being towed, now to be explained.

TOWING—FIGS. 5 and 6

In a towing situation of the tractor, there is no line pressure and so, separately, external pressure must be introduced into the system. Pressure, of course, if present generally throughout the system would tend in an unwanted manner to apply the hydraulically applied clutch, and yet local pressure properly confined is necessary in order to release the spring-applied steering brakes of the vehicle.

The status existing for the emergency towing will be that the lines are under no pressure and that a metering spring 243 against the metering spool 233 is holding the tow valve spool 232 in the position shown in FIG. 5.

Emergency fluid introduced under pressure through the one-way valve 240, such as oil or the chassis grease pumped in by a hand lubricant gun, will be prevented by a drain-connected, pressure relief valve 245 from making escape and will be forced to flow through a path as shown in FIG. 6, including the chamber 237, passages 241, bore core 242, brake passage 239, conduit 220, and right brake cylinder 90B. The path of fluid flow further includes the brake passage 239, U-passage 219, spool groove 236, bore core 230, conduit 220-2 and left brake cylinder 90B-2.

In the valve position illustrated in FIG. 6 causing this pressurized condition, the three spool valves 232, 233, and 48 will be noted to be shifted in tandem to the right as illustrated. Therefore, tow valve 232 intercommunicates passages 241 and the core 242, and the brake valve 48 intercommunicates the bore cores 218 and 230, thus establishing communication between the brake cylinders 90B and 90B-2.

Accordingly, the right brake becomes released because pressurized, and the depressurized lo clutch stays released to allow the vehicle to be towed.

Likewise, the second brake cylinder on the left side 90B-2 becomes released and the second lo clutch cylinder on the left side 96C-2 stays released.

Depressing the brake pedal will stop the vehicle under tow. The pedal-operated pull connection 138 will draw the valve 48 slightly further to the right than shown in FIG. 6. Hence, the land 234 will uncover the U-passage 219 and dump both brake cylinders through the path to drain including bore core 225, U-passage 223, bore core 224, a bore core 316, and drain D.

ALTERNATIVE ACTION

The foregoing is the only exception to the general rule. The general rule is that the clutch and clutch and brake on the right side of the tractor act solely in alternation to one another and the clutch and clutch and brake on the left side act solely in alternation to one another. For example, under low or moderately low pressure in both hydraulic circuits of the system, the clutches will remain disengaged whereas the brakes either will be fully engaged or will drag to the proper degree.

On the other hand under high or moderately high modulated hydraulic pressure, the clutches will individually be fully engaged or the affected lo clutch will slip to the degree desired, while the brakes will stay released.

SINGLE CONTROL PRESSURE

From the foregoing, and with specific reference to the lo clutch inlet-outlet port 200 of FIG. 2, it is evident that a single control pressure applied to an inlet-outlet port 200 will, depending upon its value, set the tractor in selective conditions for, respectively, full braking, brake dragging, essentially no clutching or braking, clutch slipping, and full lo clutching without perceptible "fight" between a clutch on one hand and the brake on the other. This inherent coordination makes for a significant simplification of lo clutch control.

And in a simpler manner for hi clutching later to be described, I digress for the moment just to point out that this same idea is carried forward for the hi clutching in alternation with braking, similarly accomplished automatically without fight or double drive.

To say that lo clutch-brake pressure is always at a common pressure level is not to say that the lo clutch forces contended with are ever equal to or could be equal to the brake forces which have to be contended with. Not only does the brake cylinder 90B have the larger volume and larger circumference than the lo clutch cylinder 96C radially inside thereof; but also the cylinder 90B is seen by inspection to have the obviously larger volume and cross section for more hydraulic force. Reason would appear to exist for having the cylinder 90B springs stronger, but the real reason now to be explained is not altogether obvious.

LIGHT/HEAVY SPRINGS—FIG. 3

Typical for both sides of the tractor, the spring force of the brake springs 92 for the right side is in the relatively heavy-spring range of about 100–160 psi (7–11 atmospheres) at the extremes of travel allowed the springs. For the clutch springs, the spring force at 98, for example, is in the correspondingly light-spring range of 60–95 psi (4–6 atmospheres) at the extremes of lo clutch spring travel. These figures are ones equivalent to, and in terms of, the actual hydraulic system pressure; and it will be seen due to the strength inequality that one set of springs will have completed its travel just after the other set of springs begins its travel.

Thus if I increase the hydraulic pressure from 60 psi (4 atmospheres) to 160 psi (11 atmospheres), the lo clutch springs immediately begin their contracting travel and complete this travel of contraction at 95 psi (6 atmospheres) so as to bring the individual lo clutch discs into initial engagement, that is, just making contact but with no pressure of engagement thereupon. Then immediately after 100 psi (7 atmospheres) is exceeded in this system, and contemporaneously with pressure of engagement being moderately applied to the already engaging clutch discs, the brake springs 92 begin collapse so that the brake discs, e.g., discs 108B which are no longer under any residual spring contact pressure, are allowed to free themselves from contact and the disengagement continues to 160 psi (11 atmospheres) when the brake springs reach their full extent of contracting travel.

The reverse order is also true because, with decreasing circuit pressure, the brake springs 92 expand for the principal portion of their travel as hydraulic pressure drops from 160 psi (11 atmospheres) to 100 psi (7 atmospheres). Then as the decreasing pressure continues dropping to 100 psi (7 atmospheres), and then 95 psi and below, pressure of contact building up in the brake springs is exerted on the brake discs while the lo clutch discs 110C, which remain under no contact pressure, are free from the pressure plate 100 as the clutch springs 98 thereafter expand to the full extent of their allowed travel. The lo clutch spring travel for total clutch release is completed at the point of a pressure drop to 60 psi (4 atmospheres) in the hydraulic circuit.

Although we can doubtless attach significance to the sequencing of the spring sets so as practically to avoid clutch-clutch-brake "fight", there is some deeper significance attached to the sequencing from coordinated spring rates, because of inherent cushioning in hydraulically setting the brakes and engaging the clutches, now to be explained.

CUSHIONING OF CLUTCH—FIG. 3

A desired pressure-time relationship is graphed in this figure leading up to full clutch engagement, and an illustrative curve is shown composed of connected linear segments and denoted by a, b, c, d, e, f, and g. The curve segment ab represents zero pressure maintained in the hydraulic circuit by the metering valve, not shown. When the metering valve is hydraulically shifted into its clutch-fill position, pressure rise is practically instantaneous as illustrated by the curve segment bc whereas the segment cd denotes a slow rate of hydraulic pressure rise occurring throughout the entire spring travel range of the clutch springs, not shown. That is to say, spring travel of the clutch springs toward full spring compression means that the clutch cylinder, not shown is filling with progressively increasing volume and therefore readily accommodating the metering valve flow so that the pressure rises only gradually. At the point d, the brake discs remain in contact under slight pressure whereas the lo clutch discs make contact under no contact pressure.

Novelty is felt to reside in the increasing pressure situation represented by the curve segment de. In that situation simultaneously with contact pressure on the clutch discs being initiated and progressively increasing, the brake springs, not shown, immediately at 100 psi start undergoing their entire range of travel and an important function is transpiring. The important function is that volume in the brake cylinder, not shown, is progressively enlarging and is hence consuming in good part the metered fluid flow from the metering valve, thus limiting the pressure rate of rise to the desired slow rate. Accordingly, clutch contact pressure rises essentially linearly at slow controlled rate, rendering initial engagement of the clutch soft and free from abrupt shock. Cushioned engagement of the discs means appreciably reduced wear on their friction engageable surfaces, lower shock loads, and smoother steering.

The operation represented by the curve segment ef is final pressure application to the lo clutch discs which follows at a fast rate of rise in pressure for complete clutch engagement; practically no clutch slip is allowed during this operation. The completed engagement is represented by the curve segment fg, with the lo steering clutch involved being fully engaged for a fixed 1:1.3 step-down gear ratio at one side of the vehicle and the companion brake being fully disengaged so as not to interfere.

CUSHIONING OF BRAKE—FIG. 4

A pressure-time relationship is graphed in this figure illustrative of the events culminating in full spring-applied brake engagement, and the illustrative curve is composed of interconnected linear segments and is denoted h, i, j, k, l, m, and n. The curve segment hi represents the hydraulic system at one side of the vehicle being under full modulated pressure as directed thereto by the metering valve on that side, not shown. Shift of the metering valve into a position allowing more metered escape of the hydraulic fluid from the system is represented by the curve segment ij, illustrating a somewhat instantaneous or abrupt decrease of pressure in the system. Full travel of the brake springs, not shown, due to their selected spring rate, is represented by the curve segment jk. That is to say, the brake springs expand over their principal range of travel and the effective volume of the brake cylinder progressively decreases as the system pressure continues to drop. The effect of the emptying brake cylinder is that the rate of pressure drop is comparatively slowed down as the outflow from the cylinder makes its way through the metering valve, not shown. And upon reaching the point k on the curve, the condition as reflected at that point dictates that the brake is in the status of having a fully collapsed cylinder and the brake discs are in contact but under no pressure, whereas the lo clutch cylinder still has the status of being full of oil but the clutch discs, not shown, remain in contact still under slight contact pressure.

Novelty is felt to be present throughout that operation represented by the segment kl of the curve. Occuring during that operation, decreasing cylinder pressure in the fully extended lo clutch cylinder, not shown, allows the clutch springs, not shown, to collapse the cylinder through their entire range of travel as generally represented by the curve segment kl. But escaping fluid from the emptying clutch cylinder requires an interval to make its way through the metering valve, not shown, and so the rate of pressure decrease is reduced during this initial application of the spring applied brake. Brake disk pressure is therefore slowly applied by the brake springs and a soft gradual brake engagement interval ensues. Cushioned engagement of the disks provides significantly increased life for their friction engageable brake surfaces and smooth steering action.

The curve segment lm represents the brake spring action following collapse of the clutch cylinder. So the final cylinder pressure reduction along the segment lm is at a rapid rate and brings on the brake application at full brake spring pressure. Thereafter, the unopposed, full-brake application interval is represented by the segment mn on the pressure-time curve. The brake is therefore fully spring-set at the vehicle side concerned, and the companion lo clutch is fully disengaged so as not to interfere.

The same cushioning occurs in the same sequence from fully hi clutched condition leading up to full brake engagement.

MODULATION—FIGS. 3 AND 4

Between the pressurization condition of full clutch-and-brake pressure, which obtains in the system when maintaining full lo clutching as finally reached in FIG. 3, and the pressurization condition of 0 drain pressure, which obtains in the hydraulic system when maintaining full braking as finally reached in FIG. 4, there lies an infinity of modulated pressures falling in the intermediate range. The steering pressure, right, and the steering pressure, left, in the tractor are independent of one another and, irrespective of what exists on the left side, for example, the steering pressure on the right side controlling speed of the right drive sprocket can be fixed at any point in the intermediate range, or in either extreme of pressurization, or can be undergoing a raising or lowering of pressures either in some sequence with one another or as an individual instance.

For instance, during lo clutching as shown being accomplished in FIG. 3, the set pressure in the lo, friction engaging, drive device concerned can be fixed at the level u which can be seen to intersect the clutch engaging curve at a low pressure point corresponding to a small amount of torque being transmitted and considerable lo clutch slippage. Or, if pressure is set at the level v which intersects the clutching curve at the point e thereon, the pressure will be fixed to afford the transmission of a moderate amount of torque and moderate slippage in the lo friction engaging drive device concerned. At the set level w at the point where the clutch engagement curve is intersected, high torque will then be transmitted and no slippage can occur in the friction engaging lo drive device concerned because it makes the track slip at that point.

Similarly with braking in accordance with the braking curve illustrated in FIG. 4, brake force can be set at the level x which intersects the braking curve at a point corresponding to a lightly dragging brake. Or at the set level y which intersects the braking curve of FIG. 4 at point l, there will be moderate brake drag because of the increasingly unopposed brake spring pressure in the friction engaging brake device. At the level z where it intersects the braking curve, the friction engaging brake device will be forcefully arresting motion because of the condition of the brake springs approaching being unopposed at that point by fluid pressure.

According to the invention the set values just considered and other such values, or the changing of steering pressure is controlled with great precision and exactitude by the means which I provide for that purpose, as will now be explained.

RIGHT SPOOL VALVE 44—FIG. 5

Among other spools interspersed along the length thereof, the right-steer valve 44 appearing in this figure carries a perch spool 244, a narrow blocking land or spool 246 having a narrow groove 248 thereadjacent, and a control land or spool 250. The valve 44 also: carries, distally, a drain spool 252 adjacent the control spool 250; carries, proximately, a hi clutch spool 254 adjacent the perch 244; and, separated by a valve groove 256 from the high clutch spool 254 and separated from the drain spool 252 by an annular recess 258 and by the spool and groove 246 and 248, the valve 44 carries a pressure spool 260. To varying degrees depending upon the longitudinal position to the right into which the spool valve 44 slides in the right bore 190, the exterior of the drain spool 252 variously communicates with a bore groove 261 which is at drain pressure and so, with like communication, does a helix 262 which is grooved into the spool exterior. Similarly, a helix 264 which is grooved into the exterior of the pressure spool 260 communicates variously with line pressure from the annular groove 256 which is supplied by the composite pressure port 170 previously described.

The helices 262 and 264 have uniform groove depth, uniform groove size, and uniform helix angle so that the resulting orifice which each helix forms with the closing surface of the valve bore 190 has constant rate of pressure drop along its length after the standard manner of pressure gradient of accurate hydropotentiometers. The resulting threads of oil flow are similar to the small flows of electric current in an electric potentiometer (not rheostat).

A signal pickup port 266 formed in the valve 44 in the base of the annular recess 258 communicates through a radial passage drilled in the valve and through an interconnecting longitudinal passage 268 with an intervalve chamber 270 defined in the bore 190 between the metering spool 226 and an end spool 269 of the right steering spool valve 44. In its communicating function in the solid line position of the valve 44 as shown in solid lines in FIG. 5, the signal pickup port 266 will cause the intervalve chamber 270 to be pressurized at signal pressure being introduced by the composite pressure port 170 and by the valve spool annular groove 256. The orifice defined by the helix 262 on the drain spool 252 functions effectively under all pressure differentials; specifically in this illustrative example, the orifice will be subjected to an overall pressure drop from the full 290 psi (20 atmospheres) line pressure in the recess 256 to the drain pressure which is maintained in the bore groove 261 by reason of the latter groove's connection 271 to drain D.

By reason of the resulting physical intervention of the pressure spool 260, a light outward pull exerted on the spool valve 44, shifting it in a direction slightly to the right from the position as shown in FIG. 5, will cause the annular recess 258 to be isolated from the full line pressure of the bore groove 192, and a portion of the orifice defined by the helix 264 will become active in supplying the signal pickup port 266 with pressure of slightly reduced value. At the same time, a further portion of the orifice defined by the helix 262 will become active as the helix withdraws from bore groove 261, rendering the pickup port 266 definitely at an intermediate point in the overall effective orifice length. Further pressure reducing shift of the spool valve 44 to the right will cause the signal pickup port 266 to slide to a position more nearly approaching the drain pressure and therefore supplying the intervalve chamber 270 with a like reduced static pressure.

Finally, shift of the spool valve 44 to its extreme of rightward travel as viewed in FIGS. 6 and 7 will block off the recess 258 and groove 192 and will place the signal pickup port 266 exclusively at drain pressure, thereby establishing the drain pressure in the intervalve chamber 270. In this manner, the pressure of intervalve chamber 270 can be accurately fixed or accurately varied among first, signal pressure, second drain pressure, and third an infinity of accurately-held pressures in an intermediate range between maximum and minimum as defined by signal and drain.

RIGHT METERING SPOOL—FIG. 6

The metering spool 226 as illustrated in this figure has a center section of reduced diameter which defines a bore passage 272 and which integrally interconnects a solid land 274 and a hollow land 276 of the spool 226. An actual-pressure pickup port 278 in the reduced center section communicates externally through the bore passage 272 and the bore groove 202 with the right inlet-outlet port 200, and communicates internally through a radial passage and a longitudinal passage 280 in the hollow land 276 with a spring chamber 282 which is at an opposite end of the spool 226 from the intervalve chamber 270, previously described.

Adjacent the reduced diameter center section of the spool 226, the solid land 274 has a medially disposed cylindrically stepped relief 284 on the shoulder; in an extreme position of the metering spool 226, as moved in the direction to the right as viewed in FIG. 6, the relief 284 will communicate with the bore groove 196 which is at drain pressure, and the actual-pressure pickup port 278 and bore passage 272 will therefore communicate drain pressure to the spring chamber 282 and to the inlet-outlet port 200. The opposite extreme position will now be described.

Adjacent its juncture with the reduced diameter center section of the spool 226, the hollow land 276 has a medially disposed cylindrically stepped relief 286 at the shoulder. In the solid line position of the spool 226 as shown in solid lines in FIG. 6, the relief 286 is out of communication with line pressure; however, the relief 286 will progressively provide communication with line pressure as the metering spool 226 shifts leftwardly as viewed in FIG. 6. Thus a metered amount of line pressure up to full line pressure can be communicated from the metering pressure port 172 through the relief 286 for ultimate communication with the inlet-outlet port 200 and the spring chamber 282 at one end of the spool 226.

A weak spring 288 which is in the hollow interior of the land 276 and which seats on an end plate 290 of the steering valve assembly 40, lightly biases the spool 226 in the direction of the opposing much stronger valve return spring set 146; the weak spring 288 serves, among other things, to prevent the metering spool 226 from drifting if, at a time when it is depressurized at 282, it happens to be out of physical contact with the end spool 269 of the right spool valve 44. In one physically constructed embodiment of the invention, the weak spring 288 had an equivalent force of 20 psi (1.4 atmospheres). So the spring chamber 282's pressure, which is the same as maintained at the clutch-and-brake inlet-outlet port 200, is established always at 20 psi less than signal pressure as maintained in the intervalve chamber 270.

SIGNALING-METERING—FIG. 6

The first bore 190 and the spool elements therein respectively: have the restrictive right branch 168 connecting high pressure thereto from the main pressure line 56, through split 160 and said branch 168 into the bore core 182; have the same branch 168 connecting the high pressure thereto through the U-passage 184 into the composite pressure port 170 and bore groove 192; have the same branch 168 connecting the high pressure thereto through the bore core 182, a spool groove 291, the adjacent bore core 186, and the passage 188 into the bore groove 202; have a conduit 198 connecting the low pressure of drain thereto leading from the bore groove 196; have the low clutch line 204 connecting the inlet-outlet pressure thereto from the low clutch 96C and said line 204 into a side passage 293, inlet outlet port 200, and bore groove 202; and have the high clutch passage 132 connecting the inlet-oulet pressure thereto from the high clutch 97H and passage 132 through a bore core 294 and port 295 into the bore groove supplied by the composite pressure port 170.

By controllably connecting two of the high pressure and low pressure conduits just described, the pressure and drain spools 260 and 252 of the right spool valve 44 precisely set the signal pressure at a desired value in the intervalve chamber 270, and the metering spool 226 at its end adjacent the intervalve chamber 270 is exposed to that pressure because of the latter's communication thereto in the valve 44 through the signal pickup port 266 and longitudinal passage 268. As already indicated, the signal pressure established by the valve 44 varies between the high and low pressure conduit from a maximum to a minimum; that variance is proportionally in accordance with the effective length of orifice defined by the helices 264 and 262 on the spools 260 and 252.

The control orifices formed in the metering spool 226 by the cylindrical reliefs 286 and 284 have uniform cross sectional area throughout and are equal in size and effective fluid handling capacity. The longitudinal position of the spool 226 establishes the relative rate of inflow of pressure fluid and outflow of drain fluid through the ends of the bore passage 272, accordingly establishing the pressure of the inlet-outlet port 200 between the high and low pressure conduits from a maximum to a minimum.

In theory, the metering spool 226 stablizes in its position at the point when inflow through the relief 286 into passage 272 and the outflow therefrom through the relief 284 equalize. At that point, if we assume zero clutch leakage, the pressure in the spring chamber 282 which is at one end of the spool 226 and which equals inlet-outlet pressure, is also essentially equal to the signal pressure in the intervalve chamber 270. Or, more generally, actual inlet-outlet pressure in the chamber 282 equals desired pressure set in the chamber 270, if the minor bias of the weak spring 288 can be ignored, which it can be for my principal considerations.

In its satisfied or equilibrium position in actual practice, however, the valve cracks the relief 286 open enough always to compensate for clutch and brake leakage flow and usually, if not always, the drain-connected relief 284 will stay closed except during clutch or brake evacuation. The metering valve 226 is dynamically held in satisfied position with the combined force from actual pressure and spring pressure at 282 being exactly balanced by the force of the desired pressure being signalled in the intervalve chamber 270.

It is primarily, of course, the strategic location and arrangement of pickup ports 278 and 266 and longitudinal spool passages 280 and 268 in the valve elements which makes it possible to have these elements compactly arranged so as to fit end-to-end in the bore 190 which slidably receives them in common. These valve elements are totally unlike in function as they mutually relatively move in their bore, and they have a strict master-follow-up relationship. The right valve 44 is the element serving as the exact-static-pressure-dictator and position-dictator, and the spool 226 serves as automatic followup element to take a corresponding satisfied, dictated position in the bore 190.

FULL LO CLUTCHING ON RIGHT—FIG. 5

Similarly occupying the full clutching position as shown for the left spool 44-2, the right spool valve 44 is shown in this figure in a position supplying line pressure to the right clutch cylinder 96C and, likewise to the right brake cylinder 90B. In other words, main pressure from the line 56 leads in a path through the right restriction branch 168, the bore core 182, the spool groove 291, a bore core 186, a passage 188, the metering pressure port 172, a bore groove 202, thence into the inlet-outlet port 200 where it splits in branches flowing one way through the lo clutch line 204 into the lo clutch cylinder 96C, and flowing the other way through the passage 206, the bore core 208, a spool groove 297, the bore core 212, the cross passage 214, the bore core 216, the port 217, the U-passage 219, thence through the brake conduit 220 into the right brake cylinder 90B.

At the same time, the solid land 274 of the metering spool 226 blocks the right end of the valve passage 272, preventing fluid in the inlet outlet port 200 from escaping from the relief 284 and bore core 196 to drain D through drain line 198.

In the desired way, therefore, the right clutch cylinder 96C will force the lo right clutch disks, not shown, into full engagement and the right brake cylinder 90B will force the right brake piston, not shown, into fully disengaged position.

FULL BRAKING RIGHT VALVE 44—FIG. 6

For braking at the right side, the spool valve 44 from its valve-in position is pulled by the lever connection 144 to its full valve-out position as shown in solid lines in FIG. 6. The metering spool 226 follows the valve 44 part way under bias of the light spring 288 in the spring chamber 282, thus occupying its full rightward position as shown in solid lines in FIG. 6. Because the signal pickup port 266 of the valve 44 is connected by the helical groove 262 with the drain D through the drain line 271, and is cut off from line pressure at 192, the pickup port 266 is at drain pressure and communicates the drain pressure through the valve longitudinal passage 268 to the intervalve chamber 270. The metering relief 286 of the metering spool 226 is covered, blocking off the inlet-outlet port 200 from line pressure, whereas the control orifice formed by the relief 284 and the bore passage 276 establish the inlet-outlet port 200 at the drain pressure of bore groove 196. Hence, the actual-pressure pickup port 278 communicates drain pressure through the longitudinal passage 280 and hollow interior of the hollow land 276 to the spring chamber 282.

Pressures at opposite ends of the spool 226 are thus equalized. Hence, the right brake and right lo clutch cylinders, not shown, empty in that sequence through the respective brake conduit 220 and clutch conduit 204 so that the right brake 90B is fully spring engaged and the right clutch pressure plate, not shown, in the lo clutch 96C is fully disengaged.

DRAG: ON BRAKE CAUSED BY VALVE 44—FIG. 7

In the illustrated position of the right-steer spool valve 44 in this figure, in which the corresponding system pressure will be 40 or 60 psi (3 atmospheres or 4 atmospheres), for example, the valve 44 will cause partial braking at 90B on the right side, such as for a steering turn. In order to do so, the signal pickup port 266 in its relation to the settings of the respective double helices 264 and 262 will first communicate the desired signal pressure to the intervalve chamber 270.

The metering spool 226 is shown making a slight adjustment in the rightward direction of the arrow 300 into a balanced position. Both stepped reliefs 286 and 284 will be covered; both control orifices will therefore close off and stay closed momentarily to the point where clutch and brake leakage reduces actual pressure down to signal pressure. Thereupon, the stepped relief 286 forming the high pressure control orifice of the metering spool 226 will be barely uncovered to allow fluid flow, at a slow rate under high pressure drop, to sustain in steady state the clutch and brake leakage. The chambers 282 and 270 under the respective actual and desired pressures at opposite ends of the spool 226 will again be essentially equalized in pressure.

SLIP CLUTCH LO DRIVE ON RIGHT—FIG. 8

The right-steer spool valve 44 is shown adjusted in, and the metering spool 226 is shown in position for partial right side lo clutching corresponding to an hydraulic pressure of 120 or 150 psi (8 or 10 atmospheres), for example, in the system. In such valve position, the pickup port 266 for the right-steer valve 44 will be communicating the desired pressure to the end of the metering spool 226 confronting the intervalve chamber 270. An essentially equal and opposite pressure will be communicated by the pickup port 278 into the spring chamber 282 at the end of the spool 226 adjacent the valve plate 290. A minor, steady flow of fluid from the pressure port 172 into the inlet-outlet port 200 will be maintained by the metering spool 226 after it stabilizes, because the partially uncovered orifice through the stepped relief 286 provides such minor, steady flow as make-up volume for clutch and brake leakage.

The resulting slipping clutch lo drive at the right side of the tractor will, if complemented by a full clutching lo drive on the left side, not shown, produce sweeping turns or else more gradual sterring turns to the right as desired. Such complementing lo drive will now be described.

OPERATION: SECOND CLUTCH-CLUTCH-BRAKE VALVE—FIG. 5

The left or second clutch-clutch-brake spool valve 44-2 and metering spool 226-2 are illustrated in this figure in the full clutching lo position. The accessibility of the second bore 190-2 compared to the first one 190 is essentially the same: for pressure from the composite pressure port and metering pressure port 164 and 166; for drain from drain bore groove 296 thence to drain line 271; for drain from the drain bore groove 298 thence to the drain line 198; for inlet-outlet pressure from inlet-outlet 200-2 thence to the lo clutch line left 204-2; for inlet-outlet pressure in the branch leading from passage 227, through bore core 300, bore core 302 and conduit 228, thence into conduit 304, bore cores 229 and 230, and left brake conduit 220-2; and for inlet-outlet pressure from bore core 305 thence into hi clutch conduit right 306-2 for the hi clutch cylinder 97H-2.

For the sake of brevity, a disclosure is omitted of the various positions of the valve elements in the second bore 190-2 for causing no clutching or braking, partial clutching, partial braking, and full clutching and full braking on the left side of the tractor.

FOOT BRAKE SPOOL VALVE 48—FIG. 5

In reference to the brake bore 221 shown receiving it in this figure, the foot brake spool valve 48 is shown positioned all the way in, producing no braking. Consistent with its purpose in that position, and for controlling the right side of the tractor, the foot brake valve 48 provides an unimpeded braking connection between the cross passage 214 from the right steering valve 44 and the right brake cylinder 90B, in a path including the passage 214, the bore core 216, the brake bore port 217, the core and U-passage 218, 219, and the right brake conduit 220. Therefore, the right steering valve 44 modulates pressure in the brake cylinder 90B as desired, and the foot brake valve 48 does not interfere.

Similarly, the left steering valve 44-2 modulates the pressure in the left brake cylinder 90B-2 unimpededly, in a path including bore core 200-2, passage 227, bore core 300, bore core 302, conduit 228, conduit 304, bore core 229, bore core 230, and brake line 220-2 leading to the right brake 90B-2. Hence, the steering valves 44, 44-2 can hold both steering brakes released, and the brake valve 48 introduces braking on neither side of the tractor. However, by modulating the pressures in the brake cylinders, which the brake valve 48 can do by progressively dumping them to drain, the brake valve can cause the brakes to be set for various degrees of drag or be fully set as will now be explained.

DRAG: ON BRAKE CAUSED BY VALVE 48—FIG. 7

When, by means of the pedal connection 138, the brake spool valve 48 is pulled, the initial activating movement enables the brake land 234 as illustrated to block off the bore port 217 leading to the right brake line 220 and the right brake cylinder 90B. Similarly, the initial movement allows the brake valve land 235 to block off the bore core 230 leading through the left brake line 220-2 to the left brake cylinder 90B-2.

However, in order to ensure brake cylinder dump paths responsive to steering valves 44 and 44-2 following the noted initial movement of the brake valve 48, alternate dump paths are available leading to drain first, from the brake cylinder 90B, brake line 220, brake passage 239, bore core 242, brake bore 221, check valve line 308, bore core 216, cross passage 214, bore core 212, port 210, bore core 208, passage 206, and inlet outlet port 200 leading thru line 198 to drain D; and second, from the left brake cylinder 90B-2 through the brake line 220-2, conduit 310, brake bore 221, check valve line 312, and line 228 controlled by the inlet outlet port 200-2 which is connected to drain appropriately thru the line 198 by the left steering valve 44-2.

The valves in the check valve lines 308 and 312 are ball check valves which unseat in the direction of the steering valves and drain; thus they do not interfere with the individual brake cylinder dump paths and their function is to prevent cross flow between those two paths.

From the position as shown in solid lines in FIG. 7, in which the brake valve 48 has temporarily isolated the brake cylinders from modulation by such brake valve 48, further pull out of the valve 48 to the right, as viewed, causes a progression of events in sequence. First, in progress of outward movement on the valve 48, the right and left brake cylinders 90B, 90B-2 are intercommunicated by the intervening groove 236 of valve 48 for coordinated application of braking on both sides of the vehicle. Next, in pull out progress of the valve 48, the brake valve land 234 directs pressure fluid from the U-passage 223 thru the U-passage 219 to both brakes 90B and 90B-2. The line pressure conduit 56 feeds such pressure fluid to the U-passage 223 in a path including junction 160, restriction 168, bore core 182, restriction 222, and U-passage 223, which latter would tend to have high pressure except for the intervening dumping function of the brake metering valve spool 233. At this point the longitudinal load on a metering spool spring 314 is equivalent to about 75 psi (5 atmospheres), and so the metering spool 233 regulates the pressure in U-passage 223 to about 75 psi by dumping through a path including the brake bore core 316 leading to drain D. The resistance of a constantly acting or full travel return spring 318 on valve 48 starts to be supplemented by a strong, lost motion travel, brake valve return spring 320 to indicate brake application to the operator. To make up for brake cylinder leakage, minor fluid flow thereto coming from the restriction 222 is maintained at the 75 psi level so that there is light drag on both brakes.

Foot braking has no effect on the clutch engagement at either side of the tractor. So if the steering valves have the respective positions for partial clutching lo on the right side and full clutching lo on the left side (FIG. 8), the left and right brakes will have unequal drive on them at the two sides of the tractor, which therefore will execute at very slow speed a right turn, slow in the respect that both tracks are being partially braked by action of the foot brake. It is evident the graduality or sharpness of the resulting turn will depend in part on the terrain, e.g., clay surface, gravel surface, and so forth.

Next in pull out progress of the brake valve 48 in FIG. 7, the longitudinal compression on the metering spool spring 314 becomes more and more relaxed and the cylinder brake pressure proportionally reduces for increased, equalized braking at both sides.

This hydraulic braking is proportional to the pedal travel, up to and including full braking now to be described.

FULL BRAKING, FOOT BRAKE VALVE 48—FIG. 8

When the brake spool valve 48 is pulled by means of the brake connection 138 and the foot brake and into the full brake position as illustrated in this figure, the intervening groove 236 equalizes the hydraulic pressure between the right and left, spring-applied brake cylinders 90B and 90B-2. By a common path the two cylinders are jointly connected to drain through a passage 219, bore core 225, U-passage 223, bore core 224, thence brake bore core 316 to drain D.

Hence, unopposed equalized full brake spring pressure is applied to both sides and the tractor is braked to a full stop. The restriction 222 offers substantial resistance preventing the drain path from unduly lowering line pressure and from affecting independent operation of the steering clutches while the foot brake is operating.

DETENTED LO TO BR OPERATION—FIGS. 2 AND 5

Each steering lever is hydraulically detented in mid range of travel at a partially retracted LO position, as indicated in solid lines for the left lever 42-2 in FIG. 2. Both valves 44 and 44-2 have that corresponding hydraulic position as shown in FIG. 5 and are each held in equilibrium there once the levers concerned put them there.

More specifically in the example of the hydraulically detented valve 44 in FIG. 5, the right clutch pressure from the restriction 168 is transmitted directly to the intervalve chamber 270 via the U-passage 184, port 170, spool groove 256, a bore core chamber 321 and a pick up port 266, and thence through passage 268 to said chamber 270. The outwardly directed force moves enlarging the latter until counterbalanced in both directions in the bore 190.

First, the metering spool valve 226 moves to the left, to a point at which the increasing metered output pressure exerted in end chamber 282 creates a force which, when supplemented by the increasing force of the collapsing valve spring 288, balances the equal opposing force from pressure in the intervalve chamber 270. Second, the steering spool valve 44 will have already been manually moved rightwardly to the position as illustrated in FIG. 5, until the point at which a so-called second, lost-motion travel spring 322 in the spring assembly 146 will have become engaged and, in a so-called second position at that point as illustrated, the spring assembly mechanically balances the equal opposing force from pressure in the intervalve chamber 270. In that second position of the valve and spring assembly 146, two other springs namely, a first full travel spring 324 and another lost motion travel spring 326, are active and, from his hand on the right steering lever, the operator will have the feel from the control that he has reached a static, detented valve position.

In this resulting detented or second position of both valves 44 and 44-2 as shown in solid lines in FIG. 5: flow is minimal; each metering return spring 288 which can have an equivalent force as high as 20 psi (1.4 atmospheres) can effectively keep lo clutch pressure 20 psi below the full line pressure existing in line 56; the valve parts are in static balance; the lo clutches are fully engaged; and the steering brakes (also hi clutches) are fully released.

In operation of the steering levers when they both occupy the full lo clutch position in which the left lever 42-2 is shown in solid lines in FIG. 2, the lever 42 or 42-2 at either side of the tractor can be gradually rearwardly tilted by the operator from LO toward BR as to cause the track at that side to become, respectively, only partially clutched, only partially braked, or full braked causing a sweeping, gradual, or abrupt turn of the tractor to that side.

Or viewed the other way, in tilting the steering lever gradually forwardly from BR, the operator causes the steering pressure at that side to go from zero to 100 psi (7 atmospheres) in the example illustrated, changing the steering brake disks from full contact pressure to release, or zero contact pressure. The steering clutch is disengaged and remains disengaged to 95 psi (6 atmospheres).

Then during increase from 95 psi to 270 psi (6 atmospheres to 18 atmospheres) of internal hydraulic pressure, the pressure forcing the disk plates of the clutch together at the side increases from zero contact pressure to full clutching pressure.

While the tractor can be braked to a full straight stop by pulling the steering levers 42 and 42-2 to the rear simultaneously, the simple way intended for producing a full straight stop is by full depression of the foot brake 46. In one physically constructed embodiment of the invention the steering brakes, under their full stop setting, could be overcome with engine torque only with the transmission gearing set in the lowest gear and with full power clutching.

As herein disclosed the lo clutch release springs 98, which can be characterized as light springs, are described as allowing the clutch piston at 60 psi (4 atmospheres) to start moving and then at 95 psi (6 atmospheres) to encounter the solidness of the pressed-together clutch disks which the piston contacts. The 95–100 psi demarcation boundary for full lo clutch release and onset of brake engagement is made manifest to the feel of the operator, and the left steer spool valve 44-2 has the correct position as shown in solid lines in FIG. 8 to illustrate the situation. Specifically, a third, lost motion travel spring 328 comes into engagement at the 100 psi demarcation point. The operator feels the extra resistance build-up as a rise in steering lever effort when the valve 44-2 under pull at 154 first encounters the third spring 328 of its spring assembly 158.

It is evident that, if desired, the lo clutch release springs can be made somewhat weaker, allowing the clutch disk plates to be in contact for a more perceptible effect with the clutch piston before the brake can have reached 100 psi (7 atmospheres) in its cylinder and have fully released. Or if the brake springs 92, which can be characterized as heavy, are made somewhat stronger, the same effect can be made to occur whereby the lo clutch piston will have come into contact with and started perceptibly compressing the lo clutch plates before the brake is fully released. In these ways the overlap, whereby both the lo clutch and the brake are slightly-to-moderately engaged at the same time on one or both sides of the tractor, can be varied to suit individual circumstances and needs.

Alternatively, the lo clutch spring rate and travel can be given another appropriate equivalent pressure range such as 60 psi (4 atmospheres) exerted hydraulically in the clutch cylinder so as to initiate filling and the start of piston movement, and 100 psi (7 atmosphers) in the filled cylinder as the piston brings all lo clutch disks into mutual contact. An applicable brake spring range can be in equivalence 165–100 psi (11–7 atmospheres) to delineate the point where the brake cylinder starts to empty and the point where all brake disks are brought into mutual contact, respectively. So the brake and lo clutch in their mutually opposing efforts reach, theoretically at their common operative 100 psi point a condition with neither one of their sets of contacting plates under pressure at that point to control the steering output.

Or, if the selected springs set the clutch range at 65 to 110 psi and the brake range at 100 to 165 psi, the hydraulic overlap in ranges represents mechanical underlap, variable to suit individual circumstances, whereby there is a small, but definite gap in operation when the set of lo clutch plates and set of brake plates are neither set engaged.

290 PSI 1ST SIGNAL FOR F C HI—FIG. 6

A 20 atmosphere or 290 psi line pressure signal which is supplied by a steering valve in its first main drive, home position of full retraction F C HI will operate the steering mechanism into its full hi clutching setting from any other setting, and the corresponding full hi clutch setting of the left steering lever appears in the broken line position marked HI in FIG. 2.

The corresponding full hi clutch setting of the left steering valve 44-2 appears in solid lines in FIG. 6. Fluid under line pressure enters the valve 44-2 through the restriction 162, and flows on through in first and second paths until it fills the left hi clutch cylinder 97H-2 and, therefollowing, fills the left brake cylinder 90B-2 and then applies full pressure so as to clutch and unbrake, respectively. The first one of the paths, which is to 97H-2, is via 174, 176, 164, 305, and 306-2. The second path, which is to 90B-2, leads there via 174, 302, 228, 229, 235 (open position), 230, and 220-2.

In order to achieve clutch-application cushioning effects of the nature previously described in connection with FIG. 3, each set of hi clutch release springs such as a set 330 for hi clutch piston 95H in FIG. 2, has a 60 psi-95 psi (4-6 atmospheres) equivalent pressure range; so 60 psi pressure in the clutch cylinder 97H is equal to the spring force and the cylinder starts filling and at 95 psi pressure the springs are compressed at full travel, with the cylinder filled but without exerting contact pressure on the disks 111H.

Then I can achieve full clutching pressure by a further increase whereby the cylinder 90B of the spring applied brake introduces (between 100 and 160 psi) full take-up travel afforded on the brake disks 108B while filling, and while at the same time the clutch disks 111H are being engaged with a cushioning action due to the delay time required by liquid through the common port 174, FIG. 6, needed to meet the liquid demand in filling the brake cylinder 90B.

CLUTCH-CLUTCH TRANSITION AT NEUTRAL POINT—FIG. 7

At the neutral transition position N1 as shown in solid lines in this figure for the left steer valve 44-2, no first signal for the left hi clutch 97H-2 is being developed because the valve 44-2 blocks the clutch connected port 174, and no second signal for the left lo clutch 96C-2 is being developed for the same reason because valve 44-2 blocks port 164. However, the bore core 302 keeps the left brake 90B-2 disengaged by transmitting disengagement pressure thereto from branch 162 through the brake-connected passage 228.

The operator realizes by feel that he is making a transition between clutches because of increased spring resistance occurring in position N1 when a lost motion travel intermediate spring 326-2 is engaged. In other words, the constant bias of the first spring 324-2 is immediately augmented by bias from spring 326-2.

The operator encounters nothing further in the way of valve resistance in moving it into and beyond the neutral position N1.

270 PSI SECOND POSITION FOR F C LO—FIG. 5

This figure illustrates both steer valves 44 and 44-2 providing full lo clutching and driving both tractor tracks under identical lo positive drive speeds. The hi clutches 97H and 97H2 are shown blocked from receiving a pressure signal and connected to the common drain line 231 and drain D in FIG. 5.

The brakes 90B and 90B-2 are fully disengaged.

270-100 PSI 2D SIGNAL LO CL. RANGE—FIGS. 4, 8

This range appears graphically in the lower half of FIG. 4, and the right steer valve 44 is illustrated in solid lines positioned at an intermediate point in that range in FIG. 8. The sequence, as the operator withdraws the valve 44 and enlarges the intervalve chamber 270, is to go from full lo clutching pressure at 270 psi (18 atmospheres), through some intermediate clutching pressure producing partial lo clutching with appropriate clutch slip which could be attained in the valve 44 solid line position of FIG. 8, to an essentially neutral position at 100 psi (7 atmospheres) pressure in which no disk contact pressure has as yet been exerted in the brake and only the residual slight disk contact pressure exists in the lo clutch.

CLUTCH-BRAKE TRANSITION AT NEUTRAL POINT—FIG. 8

At the neutral transition position N2 as shown in solid lines in this figure for the left steer valve, the operator realizes by feel that he is making a transition releasing clutching and engaging braking because of increased spring resistance occurring when a lost motion travel third spring 328 is engaged by the valve 44-2. In other words, the collective return spring bias of the valve's first spring 324-2, intermediate spring 326-2, and second spring 322-2 is immediately augmented by bias from spring 328 to prevent overbraking starting at the transition point.

100-0 PSI 3D SIGNAL BR RANGE—FIGS. 4, 7

This range appears graphically in the upper half of FIG. 4, and the right steer valve is illustrated in solid lines positioned at an intermediate point in that range of FIG. 7. The sequence, as the operator withdraws the valve 44 and enlarges the intermediate chamber 270, is to go from a transition position at 100 psi (7 atmospheres) pressure in which disk contact pressure has practically vanished in the lo clutch and there is no disk contact pressure in the brake, through some intermediate braking pressure producing proportional partial braking with appropriate brake dragging which could be attained in the valve 44 solid line position of FIG. 7, to a full spring-applied disk braking pressure occurring under zero hydraulic pressure.

A direct change in the steering mechanism from its full brake setting to a full hi clutch setting (FIG. 6 showing of valve 44-2) is, as noted, attended by cushioning of the clutch engagement by reason of the accumulator effect of the brake cylinder as it is required to be filled through the common port to core 174.

Vice versa however, the independent passages 231 and 292 provide separate hi clutch and brake cylinder emptying paths to drain D, so that a direct change from full hi clutch setting to full brake setting (FIG. 6 showing of right steer valve 44) affords no cushioning of the brake engagement by reason of the emptying of the right hi clutch cylinder 97H. What this change of setting amounts to in effect is the direct application of the unmodulated third signal, so-called, (0 psi) to the hi clutch and brake, in concert. So their engagement action is still one of inherent alternation to each other but with cushioning, as between the two, available during the hi clutch engagement only.

LO SEEKING AUTOMATIC RESET—FIGS. 2, 5

When the operator releases a steering lever, such as the left lever when in the broken line braked position as shown in broken lines BR in FIG. 2, the return spring assembly 158 causes the left steer valve concerned to seek out the lo clutch position so that the lever 42-2 moves only part way, and resets in and is hydraulically detented in the Lo position as shown in solid lines in FIG. 2. The reason, by way of direct analogy to the full lo clutch position of the right steer valve 44 as shown in FIG. 5, is that the three return springs first 324, intermediate 326, and second 322 expand only until they reach the position shown in which their combined thrust exactly balances the opposing hydraulic force of signal pressure in the chamber 270 which has reached 270 psi (18 atmospheres) in pressure.

It is preferable to have, and indeed theoretically possible to have so little inertia in the valve and lever system that, immediately spring 322's pickup washer bottoms as illustrated in FIG. 5, the spring 322 is ineffective to expand farther and the loss of impetus makes the right steer valve 44 stop right as illustrated in full lo clutch position. Because the spring force of the second spring 322 is hydraulically countered by the intervalve chamber pressure, the converse is true that the spring 322 is active in substantially augmenting resistance to prevent the valve 44 from withdrawing to enlarge chamber 270 and to leave full lo clutching position with unwanted movement rightwardly as viewed in FIG. 5.

The tractor thus automatically responds in a smooth transition to a safe, lo clutch drive on both tracks upon the operator's release of both steering levers from a stopped position previously maintained by the levers being held by him for full braking.

It takes conscientious effort, desirably so, for the operator to move the steering levers into, and then through and past the hydraulically detented position just described. The reason is that the second lost motion travel, return spring will have just bottomed out in the position shown in FIG. 5, and so all the force that is left in the way of assistance which the operator has in overcoming the 290 psi pressure in chamber 270 against the right steer valve 44 is the force of the first return spring 324 and intermediate spring 326.

SHIFT CYCLE COMPLETION

When the operator forces the steering levers and valves, e.g., the left steer valve 44-2 as shown in FIG. 7, into the neutral clutch-clutch position N1 on the way to full hi clutching, the steering status called for is that the clutches and brake concerned are in disengaged condition, the opposing hydraulic pressure in the intervalve chamber is zero, the intermediate, lost motion travel, return spring 326-2 is bottomed out, and the constantly effective return spring 324-2 has a countervailing force over the so-called weak spring pressing against the metering valve spool 226-2.

Therefore the left steer valve 44-2 in this example will, either with or without the operator's assistance, be moved by the force of the countervalving spring 324-2 into the full hi clutching position as shown in FIG. 6.

Full hi clutching pressure of 290 psi (20 atmospheres) in the system completes the shifting cycle, with the brake concerned being fully disengaged and the hi clutch returned to fully engaged position.

LO SEEKING AUTO. RESET MODIFIED—FIGS. 9, 10

As compared to the parts and reference numerals employed in the exemplary illustrations of the invention so far, like reference numerals are applied in this modification to like parts wherever applicable.

Provided the intervalve chamber 270 appearing in these figures of drawing stays full of bubble-free hydraulic fluid often, illustratively, the right-steer spool valve 44, as it reciprocates with its adjacent end spool 269 contracting and enlarging the volume of the chamber with the valve's respective in-motion and out-motion relative thereto, performs with certainty not to overshoot when seeking full lo clutch position from full braking position.

More specifically, in this illustrative example which I provide by way of the right-valve 44, the valve is shown between its BR position and LO position, automatically seeking the latter with motion in the direction indicated by an arrow 332. The adjacent end spool 269 acting as a dashpot piston collapses the chamber 270 with a dashpot action forcing the escape therefrom of trapped fluid in a flow path through valve passage 268, signal pickup port 266, thence through the bore core chamber 321. While the flow path to and through chamber 321 is unrestricted, escape past the latter is both restricted and "uphill" with respect to back pressure head encountered.

In particular, the escape path divides from bore core chamber 321, and at least in major part the flow not only must overcome the high hydraulic resistance of the increasing effective orifice length of the hydropotentiometer 60° V-groove helix 262 in moving in the direction of the arrow 332 axially of the bore 190, but also must overcome the uphill resistance of a standpipe or overhead reservoir fluid body 334 in moving radially upwardly in a common reservoir cored cavity 336. In other words consistent with direction arrow 332, spool movement causing in-travel of end land 269 into chamber 270 causes commensurate travel of V-orifice 262 within the covering bore 190; the increasing effective length of orifice 262 as a restrictor portion to flow of the trapped fluid being displaced makes the progressive in-travel meet with increasing resistance from dashpot drag, and the land on spool end 269 decelerates with more and more slow-down.

To a minor extent if divided off at all, such divided flow branches off in the other direction through the high resistance hydropotentiometer 60° V-groove helix 264. Such flow moves axially of the bore 190, and then through the bore core 192 and out the composite pressure port 170, if and as the flow can overcome pressure fed from the opposite direction thru U-passage 184 and into pressure port 170. The pressure head through pressure port 170 is obvious because the U-passage 184 stays full always under line pressure.

In either case, and consistently as between the two, the important thing upon motion reversal is that movement of the spool valve, in withdrawing its leading end spool 269 from chamber 270 while retraction from LO to BR position, is always accompanied by a replenishing flow reintroducing into the chamber an all bubble-free and cavitation-free body of fluid under an hydraulic head.

Equally advantageously, the common cavity 336 includes a cored bore groove 338 and a symmetrical cored bore groove 340 to the right and to the left, respectively, as viewed in FIG. 10. The normal level of the body 334 of fluid in groove 340 about bore 190 is indicated at 342, so that a reservoir pool and a consequent fluid pressure head therefrom will be present with the pool staying higher than the tops of the restricted orifice 262, the chamber 270, the chamber 321, the bore 190, and the valve 44 (FIGS. 9 and 10). The reason is that the effective drain connection D from a vertical machined casing passage 344 is made to a spill point 346 in cavity 336 substantially higher than where the groove helix 262 draws from in the fluid body 334.

The spill-over poing 346 establishes the fluid level 342, which is maintained by the minute but nevertheless continuous drain flow from the 60° V-groove helix 264, as it normally operates passing fluid from groove 340 but never transferring fluid further into symmetrical groove 338 because it is diverted as spill-over at point 346 down the intervening drain-connected passage 344.

The 60° V-groove hydropotentiometer type, left steering spool valve 44:2 similarly has two well defined Br and Lo positions, and utilizes a bore core standpipe effect the same as described to provide its own dashpot effect and bubble-free replenishment effect in being positioned.

DETENTED HI TO LO OPERATION—FIGS 11, 12, 13

In this modification, like parts to the parts in FIG. 5 are identified by like reference numerals.

Provided the left metering spool 226-2 appearing in these figures of drawing can automatically sustain the brake cylinder drain path so that time is adequate for a full refill cycle, then illustratively the left-steer spool valve 44-2, as it is shifted from Hi position to Lo position, performs with sufficient delay to tap the contents from the brake cylinder and empty them off prior to the thus evacuated cylinder being refilled.

More specifically in this illustrative example which I provide by way of the left-valve 44-2, the valve is shown in FIG. 11 in the Hi position prior to being shifted. At this point, the land 250-2 of valve 44-2 blocks off the incoming line flow from the restricted line branch 162 and bore core 174; so U-passage 180 and its communicating bore cores 178 and 166 have no pressure. Therefore, an unopposed return spring 348 confined in valve 226-2 holds a similarly confined shuttle valve 350 in a reset position with its adjacent end against an end stop plug 352 therefor carried by the metering valve 226-2; the adjacent end of the shuttle valve carries an orificed plug 354.

Nevertheless, at this point in accordance with FIG. 11, line pressure readily makes its way from restricted line branch 162 through bore core 174, a first valve orifice 356, bore core 302, the branched line 228, thence into a junction 358; the flow splits, freely going in the continuing branched line 228 and 220-2, and also in a branch past the spool or land 254-2 and through a brake core 360, brake core 305 and line 306-2, into the respectively fully filled left brake cylinder 90B-2 and left high clutch cylinder 97H-2.

Although not appearing strictly to scale in the FIG. 11 modification, a ball detent ridge 359 and balls 361 are shown applied to the outer section of spool valve 44-2 so that the operator will have a definite feel point sensed by his hand when shifting, through neutral (N1 previously described), into Lo from the Hi position as illustrated.

A shift of the valve 44-2 out of Hi relieving the two cylinders of fluid is already described. Such shift proceeds straightforwardly in the case of emptying the high clutch cylinder 97H-2, but it can present a difficulty in outright emptying of the brake cylinder 90B-2. Means which I provide, now to be explained, both enable the contents to be emptied regeneratively and also automatically afford a time delay sufficient for the emptying to take place.

In particular, in FIG. 12 in the illustrated final transition position from Hi to Lo of left valve 44-2, the first valve orifice 356 closes off and stays closed, blocking line pressure from the filled brake cylinder 90B-2. A blocking spool 362 on valve 44-2 accounting for loss of connection of cylinder 90B-2 with line pressure is at the same time uncovering the brake bore core 302, reconnecting the brake cylinder 90B-2 directly with the lo clutch 96C-2 bia bore core 300, line 227, and left-steer lo clutch branch 204-2. Being able to relieve its internal pressure in this way, the filled cylinder 90B-2 under the reducing pressure attempts to and, at 160 psi, actually does start discharging the cylinder fluid contents through line 227 into the empty lo clutch cylinder 96C-2 and possibly through the inlet-outlet port 200-2 of the metering valve 226-2 as well. The reason is the inequality between the irresistable stronger brake springs 92 and the resisting weaker clutch springs 98 (FIG. 12), and between the noted comparative large volume of the brake cylinder and the small volume of the lo clutch cylinder.

Because a port 364 in the metering valve 226-2 stays open when and only when the shuttle valve 350 occupies its reset position as illustrated in FIG. 12, the drain D is fed by the open port 364 via core 298 and drain line 198 from two sources. First, the inlet-outlet port 200-2 to the degree of its activity if at all is feeding cylinder contents through a valve port 366 into port 364 due to the collapsing brake cylinder 90B-2. And second as a certainty, a second valve orifice 368 is feeding escaping line flow at reduced pressure internally through the valve port 366 into port 364, such flow coming in the path from branch 162, core 174, core 178, U-passage 180, thence through metering pressure port 166 into the second valve orifice 368. Flow from at least the second source if not both of these two sources continues for a desired momentary time delay interval, shortly to be described.

Simultaneously, a remainder of the flow through the metering pressure port 166 is diverted under moderate pressure through a valve port 370 and a shuttle radial passage 372 to a shuttle passage junction 374. The flow splits, going in a first branch axially in the orifice of the orificed plug 354 and in a second branch in a radial passage 376, a valve port 378, and exteriorly about the valve end surrounding the end stop 352, into respectively a shuttle control chamber 380 and the spring chamber 282-2 forming an end control chamber for the metering valve 226-2.

The shuttle valve 350 builds-in a longer or more long time-delay depending upon the smallness or more smallness of the orifice in plug 354, continually axially feeding the control chamber 380. Pressure of the incoming hydraulic fluid expands the chamber 380 and forces the shuttle valve 350 from reset position as shown in FIG. 12 to move into the FIG. 13 shifted position blocking the port 364 leading to drain. The shifted position is preferably reached at the point where cylinder pressure has reached a common 110 psi (7 atmospheres), rendering the brake cylinder nearly empty at 90B-2 and nearly reaching but not yet quite at the point of initiating slight brake disk contact pressure, and the Lo clutch filled at 96C-2 and under slight clutch disk contact pressure. In one physically constructed embodiment of my invention, the elapsed stroke time for shuttle 350 from its FIG. 12 position to its FIG. 13 position was 0.25 second, which was found sufficient to bring the brake cylinder 90B-2 down to its near empty condition desired corresponding to the 110 psi internal pressure reached.

Accordingly in FIG. 13, the blocked off drain D and opened line pressure core 178 afford, with the cooperation of metering valve land 276-2 operating adjacent the metering pressure port 166, a scheduled pressure build-up to full Lo clutching pressure in the respectively fully filled end control or spring chamber 282-2, control chamber 380, Lo range clutch cylinder 96C-2 (fully engaged), and Br cylinder 90B-2 (brake fully released). The gradual pressure build-up incident to refilling of the near empty brake cylinder ensures a smooth, cushioned Lo clutch engagement. A full Lo clutch drive persists thereafter on the left side of the tractor as long as the spool valve 44-2 retains its FC Lo position as illustrated; likewise, the cylinders at 96C-2 and 90B-2 retain their positions as illustrated, under the 270 psi (18 atmospheres) pressure as regulated by the valve land 276-2 in its operating metering position as illustrated. That is to say, the valve 226-2 continually sustains make-up flow for brake and clutch cylinder leakage.

In summary so far, the starting condition of the low pressure cylinder 96C-2, designed for a comparatively low clutch operating pressure, presents the problem of being empty, at drain pressure, when it should be full and under enough low pressure to begin initiating clutching; the starting condition for the high pressure cylinder 90B-2, designed to act as a clutch softening accumulator, presents the problem of being full, under high pressure, when it should be practically empty to have its capacity available to serve as the accumulator. So because the flow of a transferring pressure fluid will continue to go "downhill" through the sneak route 362 until the terminal pressures equalize, it follows under the present circumstances that, by the time the end condition has been reached in a quarter of a second, all fluid necessary to be exchanged between the cylinders 90B-2 and 96C-2 will have inherently transferred from the former to the latter at their point of equilibrium at which the pressures substantially equalize.

LO SHIFT CYCLE COMPLETION—FIGS. 11, 13, 14

The Lo shift cycle mode is dispensed with by removing the valve 44-2 from the illustrated FCLo position (FIG. 13), thus changing to others of the illustrated steering modes such as Hi (FIG. 11) and FBr (FIG. 14); in the latter modes the metering valve 226-2 is not effective in establishing metering pressure, and so the unopposed return spring 348 resets the shuttle valve 350 in readiness for the next cycle of cushioned FC Lo clutch engagement.

The detented right steering pool valve 44 (FIG. 11) is similarly detented when neutralized in the N1 position, and establishes cooperation with a shuttle and metering effect in the common bore 190 therewith the same as described to provide FC Lo engagement of the right Lo clutch 96C free from effects of shift shock.

DETENTED LO TO HI OPERATION—FIG. 2

In this figure, which is ball-detent-free as illustrated, it is evident each of the spool valves 44 and 44-2 can be provided with a detent ridge and balls as described for feel point purposes at the N1 positions of the valves between their Lo and Hi positions. It will be evident by inspection that the clutch drive path and clutch cylinder configuration for the Hi drive do not involve the high torque gear ratio or radially narrow cylinder size of the Lo clutch cylinders 96C and 96C-2.

Manifestly then, an engagement shift by either large cylinder 97H or 97H-2 in going from Lo to Hi is a shift made with a large volume of fluid for the cylinder and under low torque load on the Hi cylinder cluth plates. So shift shock is eliminated with no special measures being taken because natural oil transfer from the filled brake cylinder directly into the open volume of the Hi clutch cylinder concerned provides adequate recycling of the brake cylinder down to or below its emptied pressure of 100 psi (7 atmospheres).

GEARED STEERING SYSTEM

The foregoing system is referred to as a geared steer drive or transmission system, or simply geared steering, in contrast to existing signle drive systems having only a single steering clutch on each side of the tractor. Design complications, such as there might be, are more than offset because by contrast, one thing offered by the geared steer system is an added speed for forward and an added speed for reverse of the tractor.

Another thing offered, significantly so, is that full hi clutching on either side of the tractor attended by lo clutching on the opposite side affords a full power turn in the direction of that opposite side, i.e., the tracks at the sides of the tractor are kept each one under full power throughout the execution of the turn. And with the added (high) speed available on the outside during short radius turns and pivot turns, the turns can be completed quicker.

SIMPLIFICATION

The design complications conceivable with an upgrading of single drive steering-by-driving, to a geared steering system can be noted to be minimized with the latter system as herein taught.

One important reason for the simplification is that the hi clutch and brake are siamese-connected by the steer valve concerned and that the absence or presence of a single, unmodulated 290 psi control pressure signal applied to the siamese hi clutch and brake via their common port 174 inherently coordinates such clutch and brake for their alternate engagement; to siamese pairs of intakes on manifolds is accepted practice in the art, such as in engine inlet manifold connections, but to use a siamese connection on hydraulic cylinders involves a much different consideration. A similarly important reason is that the lo clutch and brake are siamese-connected by the branches 204, 206 and that a single control pressure signal incrementally modulated at and between 0 and 270 psi likewise inherently coordinates the siamese lo clutch and brake, in common at 200.

An equally important reason how the simplification is herewith accomplished resides in the direct internal hydraulic interconnections and valve consolidations realized from having the present coacting left steer and metering valve spools share a common bore, the coacting right steer and metering valve spools share a common bore, and the coacting tow and brake valve spools hereof share a common bore. Also existing parts are put to, besides their regular function, some special use to provide slow-down where required. Specifically, the inherent flow-resistance of V-groove 262 is utilized to make it a dashpot restriction to slow down valve spool movement in FIG. 9; and the otherwise unused interior of the metering valve 226-2 is adapted by insertion of a shuttle therein to make the valve slow down the engagement of the Lo clutch in FIG. 12 until cushioned clutching of same will be insured.

Variations within the spirit and scope of the invention described are equally comprehended by the foregoing description.

What is claimed is:

1. In a transmission mechanism,
  a drive and braking train having two fluid operated friction engaging steering devices whereof one is a spring-applied brake device (90B-2) and the other is a fluid engaged drive device (96C-2) disposed so as to be hydraulically paired with the brake device;
  a selector valve (44-2) for supplying the output from a supply source of operating fluid under pressure having a restricted inlet-outlet port (200-2) common to the brake device and to said drive device hydraulically paired therewith and normally operable in a first position (LO) to connect said operating fluid pressure supply source to the common inlet-outlet port, both when the spring applied brake device is unfilled for spring applied braking and when the spring applied brake device is full, exerting full pressure brake release;
  plural springs comprising one plurality of springs of one strength operative in the brake device (90B-2) for brake application and operatively overcome by the force of the operating fluid pressure for braking pressure neutralization and, thereupon, for filling the brake device and causing the springs to yield for full pressure brake release;
  another plurality of the springs of one strength operative in the drive device (96C-2) of drive disengagement and operatively overcome by the force of the operating fluid pressure for filling the drive device and causing the springs of the latter to yield for initiating drive engagement;
  there being stronger springs in the spring applied brake device (90B-2) than in the fluid engaged drive device (96C-2) paired therewith so that filling of the latter (96C-2) and initiation of its engagement always precedes filling of the brake device through their common inlet-outlet port, thus inherently affording a cushioned drive engagement once initiated, due to the delay time required for fluid to flow through such common inlet-outlet port;
  said selector valve (44-2) having a second position (HI) independently of the drive device affording filling flow to the spring applied brake device for exerting therein full pressure brake release; and
  means (226-2, 350) effective when the selector valve is positioned directly from the second position to the first position (HI to LO) to, first, delay while emptying at least partly through said common port substantial portions of the fill volume of the fluid from the brake device simultaneously into the drive device and to drain and second, following the delay, cooperating with the selector valve to afford fluid flow of the fluid pressure supply into the common inlet-outlet port to supply the devices.

2. A clutch-brake steering system for use in a vehicle which is steered-by-driving, the system having:
  a restrictive common inlet-outlet port for conducting pressure fluid in the system;
  a final drive frame having a steering drive and a steering drive output shaft journalled for rotation therein, and clutch-brake means with friction engagable means controllable to control the shaft rotation;
  first and second fluid power cylinders controlling respective first and second friction engagable means of the clutch-brake means so as alternatively to brake the shaft, or to drive it by clutching the steering drive to the output shaft;
  a first spring for engaging the first friction engagable means controlled by said first cylinder and being opposed by the latter for controlling the output shaft;
  a second spring operating to disengage the second friction engagable means of said second cylinder and being opposed by the latter for controlling the output shaft;
  means connecting the cylinders in common to said port whereby friction engagement of the first friction engageable means undertaken by the first spring incident to restrictive release of cylinder pressure from the first cylinder (90B-2) through the common port, is attended by a slowing, cushioned action thereon by the second spring operation as it collapses the second cylinder (96C-2) incident to restrictive release of cylinder pressure therefrom through the common port;
  a selector valve (44-2) for supplying the output from a supply source of operating fluid under pressure, and normally operable in a first position (LO) to connect said operating fluid pressure supply source to the common port, both when the first cylinder is unfilled for spring-applied braking and when the first cylinder is full exerting full pressure brake release;
  said selector valve (44-2) having a second position (HI) independently of the second cylinder affording filling flow to the first cylinder for exerting therein full pressure brake release; and
  means (226-2, 350) effective when the selector valve is positioned directly from the second position to the first position (HI to LO) to, first, delay while emptying, at least partly, through said common port, substantial portions of the fill volume of the fluid from the first cylinder simultaneously into the second cylinder and restrictively to drain and second, following the delay, cooperating with the selector valve to block the drain while simultaneously affording fluid flow of the fluid pressure supply into the common port to supply the cylinders.

* * * * *